(12) United States Patent
Okamoto et al.

(10) Patent No.: US 8,004,395 B2
(45) Date of Patent: Aug. 23, 2011

(54) DISPLAY SYSTEM

(75) Inventors: Toshiya Okamoto, Soraku-gun (JP); Toshiya Aoki, Kashiba (JP); Kouichi Oda, Sakai (JP); Jun Hamachi, Nara (JP); Fumiaki Fujimoto, Nara (JP); Kazuhiko Yoda, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 236 days.

(21) Appl. No.: 11/574,148

(22) PCT Filed: Aug. 18, 2005

(86) PCT No.: PCT/JP2005/015086
§ 371 (c)(1),
(2), (4) Date: Feb. 23, 2007

(87) PCT Pub. No.: WO2006/022191
PCT Pub. Date: Mar. 2, 2006

(65) Prior Publication Data
US 2008/0309474 A1 Dec. 18, 2008

(30) Foreign Application Priority Data
Aug. 24, 2004 (JP) .................................. 2004-244413

(51) Int. Cl.
*B60Q 1/00* (2006.01)
*G08G 1/123* (2006.01)
*G01C 21/32* (2006.01)

(52) U.S. Cl. ........ 340/438; 340/459; 340/461; 340/462; 340/995.1; 340/995.14; 701/211; 701/212; 701/213

(58) Field of Classification Search .................. 340/438, 340/995.1, 459–462, 995.14; 709/201–205; 345/418, 502, 505; 701/211–213
See application file for complete search history.

(56) References Cited

U.S. PATENT DOCUMENTS

| 5,007,005 | A | * | 4/1991 | Hatakeyama et al. ........ 345/473 |
| 5,022,028 | A | | 6/1991 | Edmonds et al. |
| 5,366,376 | A | | 11/1994 | Copperman et al. |
| 5,504,482 | A | * | 4/1996 | Schreder .................. 340/995.13 |
| 5,764,139 | A | | 6/1998 | Nojima et al. |
| 6,253,152 | B1 | * | 6/2001 | Ito ................................. 701/209 |
| 6,812,942 | B2 | | 11/2004 | Ribak |

(Continued)

FOREIGN PATENT DOCUMENTS
DE 199 35 892 A1 2/2001
(Continued)

OTHER PUBLICATIONS

Official communication for PCT Application No. PCT/JP2005/015086; mailed on Nov. 29, 2005.

(Continued)

*Primary Examiner* — Benjamin C Lee
*Assistant Examiner* — Lam P Pham
(74) *Attorney, Agent, or Firm* — Keating & Bennett, LLP

(57) ABSTRACT

An instrument panel display system displays vehicle information, amenity information, and safety information as images. In this instrument panel display system, data (image data, image layout data, and image output control data) for displaying the images are generated in a shared manner by a vehicle system processor, an amenity system processor, and a safety system processor. On account of this, the stability of image display on an instrument panel of a vehicle or the like is improved and hence safety of driving is increased.

2 Claims, 20 Drawing Sheets

U.S. PATENT DOCUMENTS

| | | | |
|---|---|---|---|
| 6,977,666 | B1 * | 12/2005 | Hedrick .................. 345/690 |
| 7,075,541 | B2 * | 7/2006 | Diard ..................... 345/505 |
| 7,369,044 | B2 | 5/2008 | Ono et al. |
| 2001/0019363 | A1 | 9/2001 | Katta et al. |
| 2002/0015035 | A1 | 2/2002 | Inaba et al. |
| 2003/0231259 | A1 | 12/2003 | Yui et al. |
| 2006/0290817 | A1 | 12/2006 | Yui et al. |

FOREIGN PATENT DOCUMENTS

| | | |
|---|---|---|
| EP | 1 178 394 A2 | 2/2002 |
| JP | 62-58110 A | 3/1987 |
| JP | 01-309542 A | 12/1989 |
| JP | 04-201676 A | 7/1992 |
| JP | 4-273016 A | 9/1992 |
| JP | 4-328420 A | 11/1992 |
| JP | 09-071195 A | 3/1997 |
| JP | 09-123848 A | 5/1997 |
| JP | 10-297319 A | 11/1998 |
| JP | 11-311545 A | 11/1999 |
| JP | 2000-194583 A | 7/2000 |
| JP | 2000-238552 A | 9/2000 |
| JP | 2001-121989 A | 5/2001 |
| JP | 2001-320616 A | 11/2001 |
| JP | 2001-343929 A | 12/2001 |
| JP | 2002-046502 A | 2/2002 |
| JP | 2002-154393 A | 5/2002 |
| JP | 2002-366128 A | 12/2002 |
| JP | 2003-137007 A | 5/2003 |
| JP | 2003-298938 A | 10/2003 |
| JP | 2003-309509 A | 10/2003 |
| JP | 2003-320911 A | 11/2003 |
| JP | 2004-155395 A | 6/2004 |
| JP | 2004-157434 A | 6/2004 |
| JP | 2005-205997 A | 8/2005 |
| JP | 2006-234505 A | 9/2006 |

OTHER PUBLICATIONS

Okamoto et al.: "Simulation Device, Simulation Program, and Simulation Method," U.S. Appl. No. 11/574,145, filed Feb. 23, 2007.

Nishida: "Diagnostic Support Device and Diagnostic Support System," U.S. Appl. No. 12/296,550, filed Oct. 9, 2008.

Okamoto: "On-Vehicle Display System and Display Panel Control Device," U.S. Appl. No. 12/305,002, filed Dec. 16, 2008.

Okamoto et al.: "Display System," U.S. Appl. No. 12/406,374, filed Mar. 18, 2009.

Tsubooka et al.: "Instrument Panel Display System for Mounting on Automobile, and Image Data Output Device," U.S. Appl. No. 12/293,881, filed Sep. 22, 2008.

Okamoto: "Display System, Display System Display Control Method, Data Display Program, and Recording Medium," U.S. Appl. No. 12/296,549, filed Oct. 9, 2008.

Official communication issued in the counterpart International Application No. PCT/JP2005/015086, mailed on Mar. 8, 2007.

Official Communication issued in corresponding European Patent Application No. 05772901.4, mailed on Nov. 2, 2009.

Baudisch et al., "Multiblending: Displaying Overlapping Windows Simultaneously Without the Drawbacks of Alpha Blending," CHI 2004, Apr. 24-29, 2004, pp. 367-374, Vienna, Austria.

Official Communication issued in U.S. Appl. No. 11/574,145, mailed on Feb. 4, 2010.

Official Communication issued in corresponding U.S. Appl. No. 11/574,145, mailed on Nov. 3, 2010.

Official Communication issued in corresponding U.S. Appl. No. 12/406,374, mailed on Sep. 21, 2010.

* cited by examiner

FIG. 2 INSTRUMENT PANEL DISPLAY SYSTEM 51

SCENE DESIGN A

MEN=0001,SEN=0
(SDN=0131h)

FIG. 11

| DATA FROM ECU | | SEN | IMAGE FILES |
|---|---|---|---|
| ECU SHIFT INDICATOR ECU | 0 ("P" IS LIGHTED) | 200 | SHIFT INDICATOR 1.bmp |
| | 1 ("R" IS LIGHTED) | 201 | SHIFT INDICATOR 2.bmp |
| | 2 ("N" IS LIGHTED) | 202 | SHIFT INDICATOR 3.bmp |
| | 3 ("D" IS LIGHTED) | 203 | SHIFT INDICATOR 4.bmp |
| | 4 ("1" IS LIGHTED) | 204 | SHIFT INDICATOR 5.bmp |
| | 5 ("2" IS LIGHTED) | 205 | SHIFT INDICATOR 6.bmp |
| FUEL ECU | 0 (FILL-UP) | 100 | FUEL GAUGE 1.bmp |
| | 1 (SCALE MARK 8) | 101 | FUEL GAUGE 2.bmp |
| | ...... | ...... | ...... |
| | 9 (EMPTY) | 109 | FUEL GAUGE 10.bmp |
| INDICATOR ECU | 0 (TURNED OFF) | 300h | LEFT INDICATOR 1.bmp |
| | 1 (TURNED ON) | 301h | LEFT INDICATOR 2.bmp |
| ...... | ...... | ...... | ...... |

FIG. 13

| EXPANDED SDN (MEN-SEN) | SCENE DESIGN NUMBER (SDN) | COMMENTS |
|---|---|---|
| . . . . . . . . | . . . . . . . . | . . . . . . . . |
| 1-0 | 0131h | MAIN EVENT OF SCENE DESIGN A |
| 1-100 | 0132h | SUB EVENT OF SCENE DESIGN A |
| . . . . . . . . | . . . . . . . . | . . . . . . . . |
| 2-0 | 0144h | MAIN EVENT OF SCENE DESIGN B |
| 2-300 | 0145h | SUB EVENT OF SCENE DESIGN B |
| . . . . . . . . | . . . . . . . . | . . . . . . . . |
| . . . . . . . . | . . . . . . . . | . . . . . . . . |

FIG. 15

```
<?xml version='1.0' encoding='Shift_JIS'?>
<smil xmlns="............................ />
<head id ='sample" author="Author" title="Title" copyright="CopyRight" men="1" >
    <layout>
        <root-layout backgroundColor="#000000" width="[root_lay_width]" height="[root_lay_height]" />
        <region id="r001" top="[r001_top]" left="[r001_left]" right="[r001_right]" bottom="[r001_bottom]" backgroundColor="#000000" />
        <region id="r002" top="[r002_top]" left="[r002_left]" right="[r002_right]" bottom="[r002_bottom]" backgroundColor="#000000" />
        ............
    </layout>
</head>
<body>
<par>
<img src=" BACKGROUND .bmp" region="r001" fit="fill" backgroundColor="#000000" layer="0" />
<img src=" FUEL 0.bmp" region="r002" fit="fill" backgroundColor="#000000" layer="1" />
    <subimg src=" FUEL 0.bmp" sen="100" />
    <subimg src=" FUEL 1.bmp" sen="101" />
    ......
    <subimg src=" FUEL 9.bmp" sen="109" />
</img>
</par>
</body>
</smil>
```

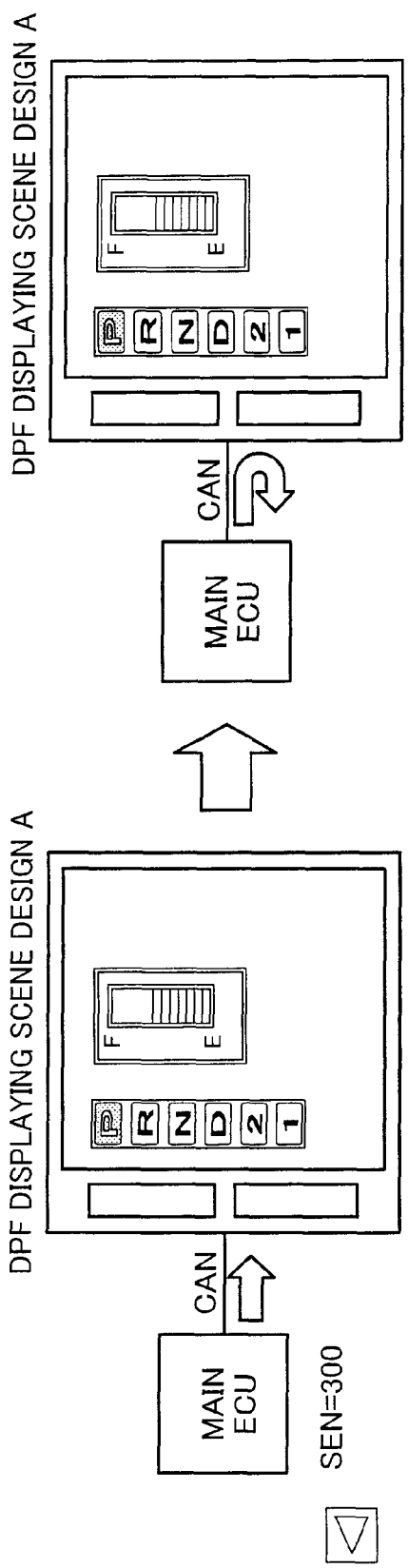
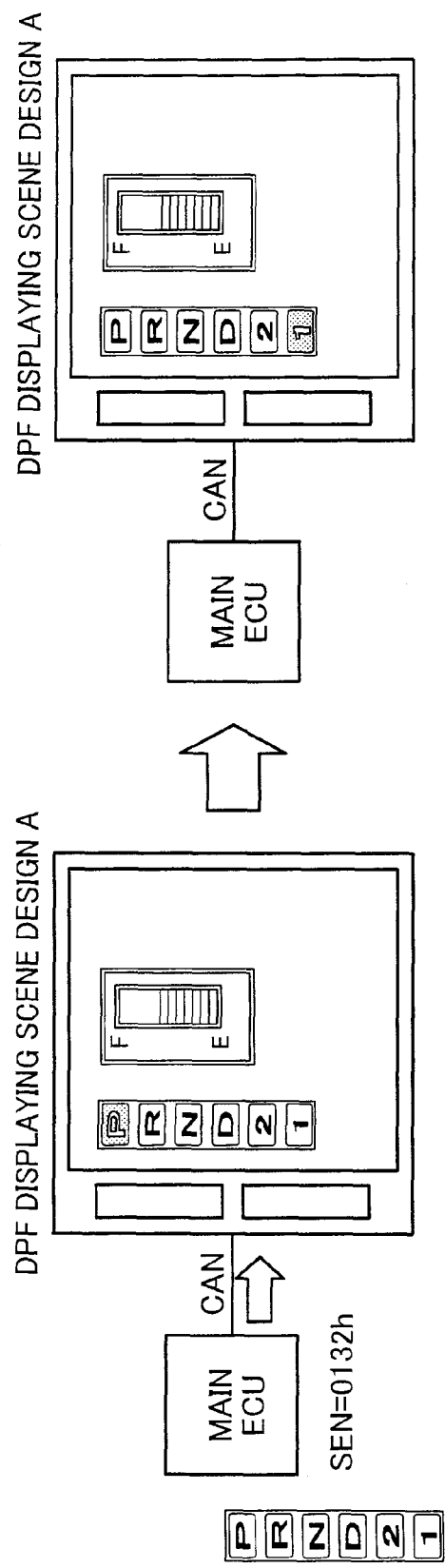
FIG. 17 (a)
FIG. 17 (b)

DISPLAY SYSTEM

BACKGROUND OF THE INVENTION

1. Field of the Invention

The present invention relates to a display system mounted on a controllable movable body such as a vehicle (for example a display system for an instrument panel).

2. Description of the Related Art

As a display system mounted on an instrument panel of a car or the like, there has recently been proposed a display system which displays on a display (display section) information assisting the driving, such as navigation information, in addition to vehicle state information such as the running speed and engine revolutions.

In doing so, information (image data) regarding the image display is typically generated by a single CPU in a centralized manner and displayed on a display. That is to say, the CPU receives sets of information (data) detected or generated by sensors and a system, generates image data based on the supplied data and the data (for image generation) stored in a storage medium or the like, and displays, on a display, images based on the generated data.

For example, a publicly-known document 1 (Japanese Laid-Open Patent Application No. 2002-154393; published on May 28, 2002) discloses, as shown in FIG. 20, an instrument panel which is provided with an entertainment display 2002a for displaying a navigation image or the like and an information display 2003 for displaying an information service image and an alert image in accordance with a detected running state and running environment of the vehicle. The entertainment display 2002a and the information display 2003a are controlled by a CPU 2020. In other words, the CPU 2020 displays a current location on the entertainment display 2002a (navigation image) based on current location information supplied from a GPS sensor 2027 and map information stored in a ROM 2051. The CPU 2020 also displays on the information display 2003a the running state of the vehicle, which is detected by signals supplied from a vehicle speed sensor 2026 and a steering angle sensor 2025.

As shown in FIG. 19, an in-vehicle wide display 1010 disclosed by a publicly-known document 2 (Japanese Laid-Open Patent Application No. 9-123848; published on May 13, 1997) is, via an image processing device 1012 including VRAM and the like, connected to an information processing device 1016 including a CPU executing a predetermined computation process, a ROM storing a processing program, and an I/O interface. This information processing device 1016 receives sets of information from a navigation system 1022, a traffic information communication system 1024, a monitor system 1026, a sensor system 1028, and a diagnosis system 1030. Based on these sets of information, the information processing device 1016 judges the running state and obtains necessary information, and then displays various information items on the wide display 101 by means of the image processing device 1012.

According to the conventional art disclosed in the publicly-known document 1, the CPU 1020 generates the image data for a navigation image displayed on the entertainment display 1002a and also generates the data of a vehicle information image displayed on the information display 1003a. Similarly, according to the publicly-known document 2, the CPU in the information processing device 1016 generates the image data for a navigation image displayed on the wide display 1010 and the image data of a vehicle information image based on the sensor system 1028 or the diagnosis system 1030.

However, in those cases where various types of images (image data) displayed on an instrument panel are generated and displayed by a single CPU which performs many information processes, a serious trouble occurs, that is, important vehicle information (speed information and alert information and the like) essential for the driving cannot be displayed, when malfunction or thermal runaway of the CPU occurs on account of overload. In particular, the load on CPUs has recently increased because of the advance of display systems (e.g. improvement in display quality and increase in the types of entertainment to be dealt with), and hence the aforesaid trouble is very likely to occur. To put it differently, the advancement of display systems has limitations in the conventional art, in consideration of the safety of vehicles. Moreover, customization is not easily done because various processes such as the generation of different types of image data are centrally carried out by a single CPU.

SUMMARY OF THE INVENTION

The present invention was done to solve the above-identified problem, and the objective of the present invention is to improve the stability of image display of a display system mounted on a controllable movable body, so as to increase the safety of the movable body.

To achieve the objective above, the display system of the present invention, which is mounted on a controllable movable body and simultaneously displays, on a display device, images respectively corresponding to plural sets of information including information regarding the movable body, is characterized in that sets of data for displaying the respective images are generated by plural processors, in a shared manner.

Examples of the controllable movable body include vehicles such as cars and trains, airplanes, and ships. Each of such movable bodies has a display system which displays plural sets of information (e.g. various types of information regarding the movable body and various types of amenity information) as images.

In the present display system, the data for displaying the sets of information as images is generated in a shared manner by plural processors. Therefore, as compared to the conventional art in which processes are contrarily dealt with by a signal processor, the burden on each processor is reduced. As a result, even if an amount of information to be displayed is increased, data for displaying the information as images is stably generated. Moreover, even if one processor malfunctions, another processor can carry on the information display. This makes it possible to improve the stability of image display by the display system, and hence the safety of the movable body is increased.

The display system of the present invention is preferably arranged such that processors are provided to correspond to the respective sets of information, and the processors generate data for displaying the corresponding sets of information as images.

According to this arrangement, since the processors corresponding to the respective sets of information are provided, it is possible to use a processor having a suitable function or capability for each set of information. This improves the display stability and reduces the manufacturing costs.

The display system of the present invention preferably include display control means for generating, from the data generated by the processors, images to be displayed. According to this arrangement, the display means integrates the sets of data generated by the processors and carries out image display. On this account, each of the processors is not required to associate the data generated by the same with data generated by another processor, and hence the burden on each of the processors is further reduced. It is therefore possible to further improve the stability of the image display.

The display system of the present invention is preferably arranged such that the data for displaying the images includes image data and image layout data. When different types of data required for image display by the processors are independently generated, it is possible to easily add an option and carry out customization. It is also preferable that the display control means is provided with a standard image interface for receiving image data from the processors, so that an option is easily added and customization can be easily done.

The display system of the present invention, which is mounted on a controllable movable body and simultaneously displays, on a display device, images respectively corresponding to plural sets of information including information regarding the movable body, may be characterized by including processors which correspond to the respective sets of information and generates image data and image layout data for displaying the images; display control means for generating display data from the image data and the image layout data, the display control means being connected to the display device the processors; a transmission path which transmits the image data between the display control means and the processors; and another transmission path which is different from said transmission path and transmits the image layout data.

According to this arrangement, since the image data and the image layout data are transmitted through different transmission paths, the burden is not placed on a single transmission path.

The display system of the present invention, which is mounted on a controllable movable body and simultaneously displays, on a display device, images respectively corresponding to plural sets of information including information regarding the movable body, may be characterized by including: processors which correspond to the respective sets of information and generate image data for displaying the images; display control means for generating display data from the image data, the display control means being connected to the display device and the processors; an image layout table which is provided in the display control means and generates image layout data from the information regarding the movable body; and a transmission path which connects the display control means with the processors and transmits the image data, the display means generating the image layout data from the information regarding the movable body and with reference to the image layout table, and generating the display data by laying out the image data with reference to the image layout data.

According to this arrangement, since the display control means has an image layout table, the processors are not required to generate image layout data. This makes it possible to reduce the burden on the processors. If the image layout data is changeable, an addition of an option and customization can be easily done by only changing the image layout data. Also in this case, it is preferable that the information regarding the movable body and image data are transmitted on different transmission paths.

The display system of the present invention is preferably arranged such that data for displaying an image corresponding to highly important information is generated by a processor which is different from a processor by which data for displaying an image corresponding to other types of information is generated.

The highly important information is, for example, information regarding the state of the movable body. In this way, a processor dealing with important information does not deal with other types of information (i.e. less-important information), and hence the burden on the processor dealing with important information is reduced. It is also possible to adopt, for important information, a processor with high security or high performance. This further improves the stability of image display.

The display system of the present invention is preferably arranged such that data for displaying an image corresponding to information which places a heavy processing load is generated by a processor which is different from a processor by which data for displaying an image corresponding to other types of data is generated.

In this manner, a processor dealing with information which places a heavy processing load does not deal with other types of information (i.e. less-important information), and hence the burden on the processor dealing with information which places a heavy processing load is reduced. It is also possible to adopt, for information which places a heavy processing load, a processor with high security or high performance. This further improves the stability of image display.

The in-vehicle display system of the present invention, which displays, as images, plural sets of information including vehicle information, is characterized in that data for displaying the images are generated in a shared manner by plural processors.

The in-vehicle display system is preferably arranged such that the information includes vehicle information and multimedia information, and data for displaying an image corresponding to the vehicle information is generated by a processor different from a processor by which data for displaying an image corresponding to the multimedia information is generated.

The in-vehicle display system preferably includes: amenity information and safety information as the multimedia information; a vehicle system processor dealing with the vehicle information; an amenity system processor dealing with amenity information; and a safety system processor dealing with the safety information, and the in-vehicle display system is preferably arranged so that the vehicle system processor generates image data and image layout data which correspond to the vehicle information, the amenity system processor generates image data and image layout data which correspond to the amenity information, whereas the safety system processor generates image data and image layout data which correspond to the safety information.

The in-vehicle display system preferably includes a graphic controller which carries out image display using the data generated by the processors.

The in-vehicle display system is preferably arranged such that the graphic controller includes an image layout table, and images indicating the respective sets of information are listed with reference to the image data, image layout data, and the image layout table.

The in-vehicle display system is preferably arranged such that the image data and the image layout data are transmitted to the graphic controller via different transmission paths.

BRIEF DESCRIPTION OF THE DRAWINGS

FIG. 11 shows an example of the relationship among components, scene designs, and image files of the sub event.

FIG. 13 shows the relationship between scene design numbers and extended SDN.

FIG. 15 shows an example of a description of a main event and sub events in a scene design.

FIG. 17(a) shows a state when a signal indicating the execution of a sub event is supplied while a scene design is displayed.

FIG. 17(b) shows a state when a signal indicating the execution of a sub event is supplied while a scene design is displayed.

DETAILED DESCRIPTION OF THE PREFERRED EMBODIMENTS

Figure 1:
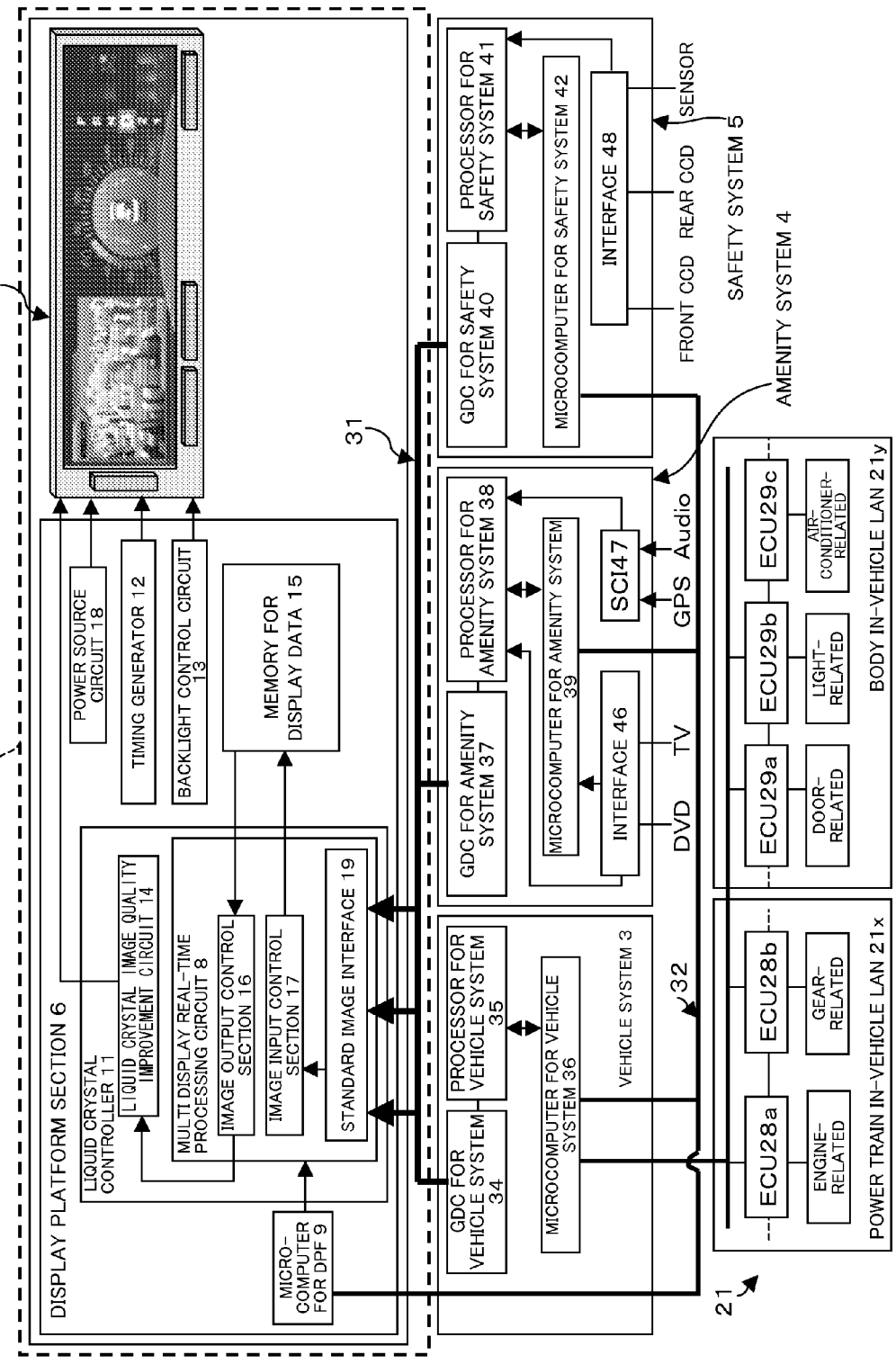
FIG. 1 is a block diagram showing an instrument panel control system including an instrument panel display system in regard of an embodiment of the present invention.
Figure 2:
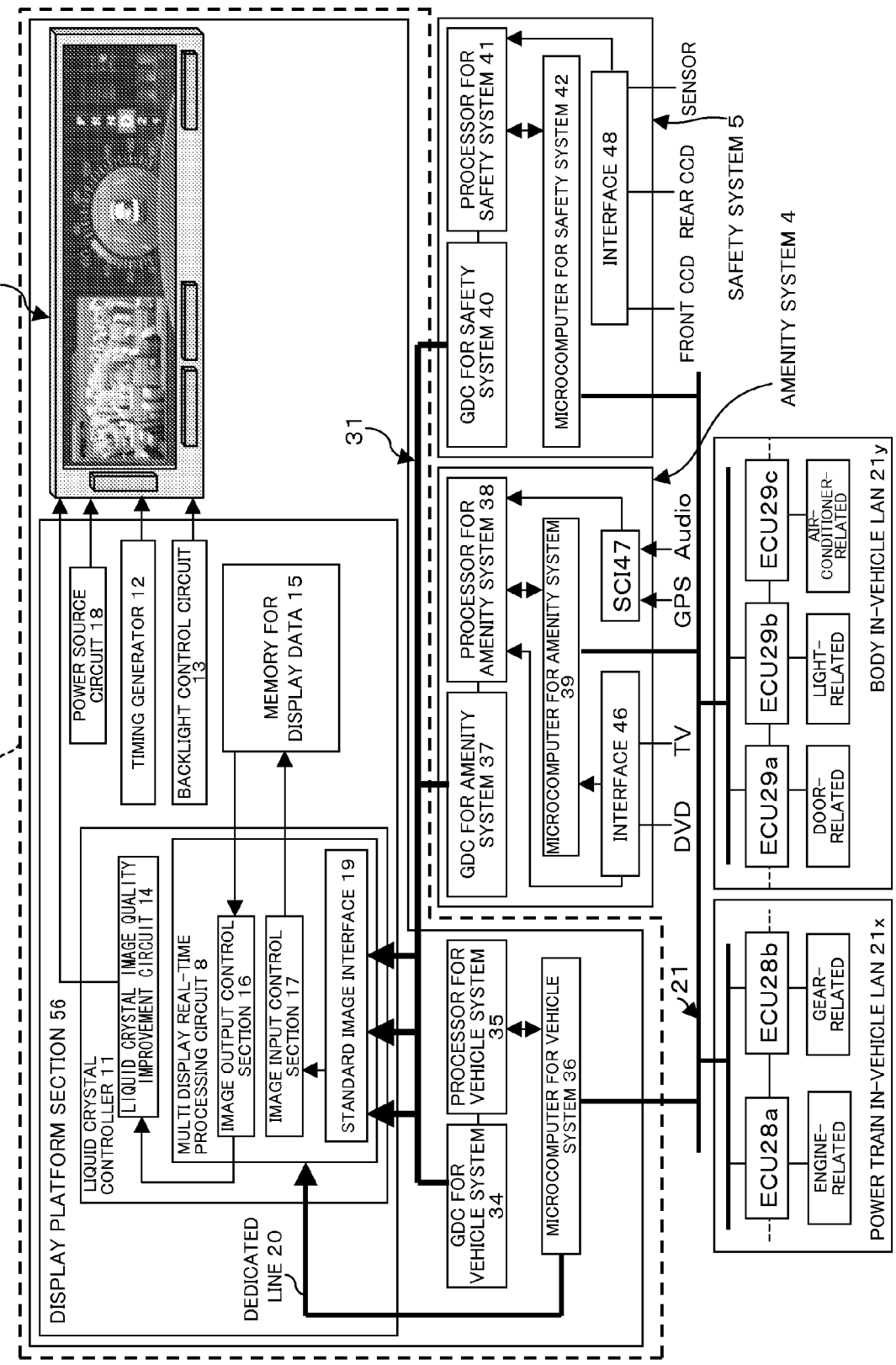
FIG. 2 is a block diagram showing an instrument panel control system including an instrument panel display system in regard of another embodiment of the present invention.
Figure 3:
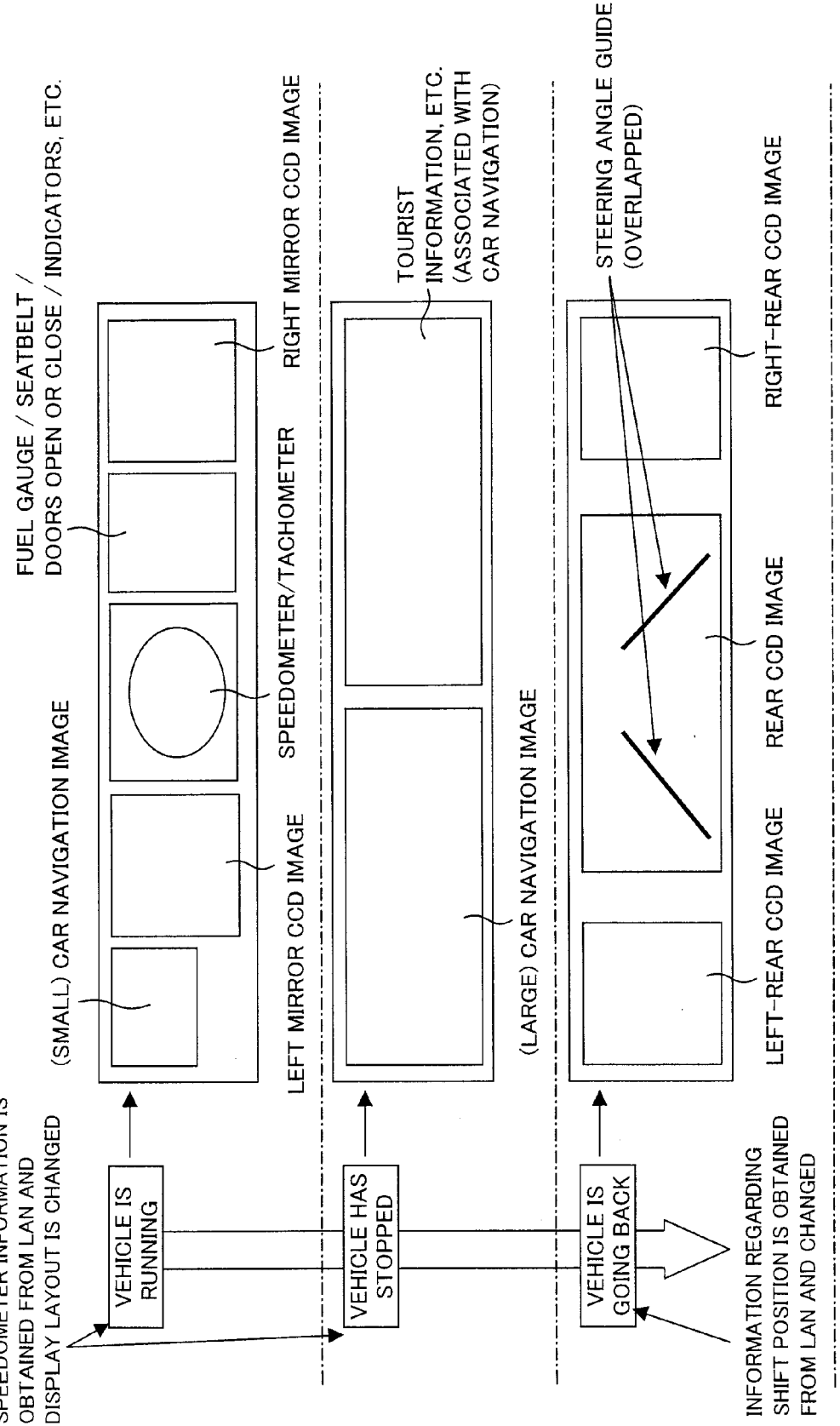
FIG. 3 is a schematic view for illustrating an example of image display on a liquid crystal panel of the instrument panel display system.

The following will describe an embodiment of the present invention with reference to FIGS. 1-3. FIG. 1 is a block diagram of an instrument panel control system for a vehicle on which an instrument panel display system is mounted. As shown in the figure, the instrument panel control system includes: an instrument panel display system 1 of the present invention; an amenity input/output system (amenity system 4) for DVD, TV, GPS, audio or the like; a safety input/output system (safety system 5) for various types of CCDs and sensors; and an in-vehicle LAN 21 for vehicle data transmission. The in-vehicle LAN 21 for vehicle data includes a power train in-vehicle LAN 21x and a body in-vehicle LAN 21y. The power train in-vehicle LAN 21x is connected to members such as an electric control unit (ECU) 28a for controlling engine-related matters and an electric control unit (ECU) 28b for controlling gear-related matters. The body in-vehicle LAN 21y is connected to members such as an electric control unit (ECU) 29a for controlling door-related matters, an electric control unit (ECU) 29b for controlling light-related matters, and an electric control unit (ECU) 29c for controlling air-conditioner-related matters.

The instrument panel display system (display system) 1 is provided with a display platform section 6 (display control means) and a liquid crystal panel 7 (display device). The display platform section 6 includes a microcontroller 9 (herein after, DPF microcontroller 9) for the display platform, a liquid crystal controller 11, a display data memory 15, a power source circuit 18, a timing generator 12, and a backlight control circuit 13. The liquid crystal controller 11 includes a liquid crystal image quality improvement circuit 14 and a multi display real-time processing circuit 8. The multi display real-time processing circuit 8 includes an image output control section 16, an image input control section 17, and a standard image interface 19.

The vehicle system 3 includes a vehicle system graphic display controller 34 (herein after, vehicle system GDC 34), a vehicle system processor (CPU, processor) 35, and a vehicle system microcontroller 36 which is compliant with in-vehicle LAN. The amenity system 4 includes an amenity system graphic display controller 37 (herein after, amenity system GDC 37), an amenity system processor (CPU, processor) 38, and an amenity system microcontroller 39 which is compliant with in-vehicle LAN. The safety system 5 includes a safety system graphic display controller 40 (herein after, safety system GDC 40), a safety system processor (CPU, processor) 41, and a safety system microcontroller 42 compliant with in-vehicle LAN.

The vehicle system microcontroller 36 is connected to the in-vehicle LAN 21 (power train in-vehicle LAN 21x and body in-vehicle LAN 21y) for vehicle data transmission. The DPF microcontroller 9 of the display platform section 6, the vehicle system microcontroller 36 of the vehicle system 3, the amenity system microcontroller 39 of the amenity system 4, and the safety system microcontroller 42 of the safety system 5 are connected to the in-vehicle LAN 32 for display control data transmission. This in-vehicle LAN 32 is an in-vehicle LAN compliant with CAN, LIN or the like, and is a transmission path on which image output control data (described later) and image layout data (described later) for controlling image display are transmitted and received with predetermined formats.

The vehicle system GDC 34, the amenity system GDC 37, the safety system GDC 40, and the standard image interface 19 of the display platform section 6 are connected to an in-vehicle LAN 31 for image data transmission. This in-vehicle LAN 31 is a high-speed LAN (e.g. MOST and IDB1394), and is a transmission path connecting, by connectors, the display platform section 6 with the GDCs (34, 37, and 40) of the respective systems. This in-vehicle LAN 31 may be constituted by a one-to-one dedicated line.

The following will describe the functions of the in-vehicle LAN 21 for vehicle data transmission, the vehicle system 3, the amenity system 4, the safety system 5, and the instrument panel 2.

The power train in-vehicle LAN 21x of the in-vehicle LAN 21 is connected to members such as the engine-related ECU 28a and the gear-related ECU 28b. The engine-related ECU 28a carries out operations such as transmission of numerical data regarding engine control and the engine, and reception of control data supplied from another ECU. The gear-related ECU 28b carries out operations such as transmission of numerical data in regard of gear control and gears, and reception of control data supplied from another ECU. From the power train in-vehicle LAN 21x, data (real-time data required to be sent in real time and to be highly reliable) concerning alert information, indicators, speed, revolutions is transmitted, as vehicle data, to the vehicle system microcontroller 36 of the vehicle system 3.

The body in-vehicle LAN 21y of the in-vehicle LAN 21 is connected to members such as the door-related ECU 29a, the light-related ECU 29b, and the air-conditioner-related ECU 29c. The door-related ECU 29a carries out operations such as transmission of a signal to open/close a door and reception of control data from another ECU. The light-related ECU 29b carries out operations such as transmission of a signal to turn on/off a light and reception of control data from another ECU. The air-conditioner-related ECU 29c carries out operations such as transmission of data related to air conditioner control and an air conditioner, and reception of control data from another ECU. From the body in-vehicle LAN 21y, data (low-speed transmission thereof does not cause problems) concerning open/close of doors, lights, air conditioner control and the like is transmitted, as vehicle data, to the vehicle system microcontroller 36 of the vehicle system 3.

The in-vehicle system microcontroller 36 of the vehicle system 3 has interfaces to vehicle-specific LANs (Local Area Networks) such as CAN, LIN, and FlexRay.

The vehicle system microcontroller 36 receives various types of vehicle data (power train vehicle data and body vehicle data) from the in-vehicle LAN 21 for vehicle data transmission, and supplies the vehicle data to the vehicle system processor 35.

The vehicle system microcontroller 36 sends, via the in-vehicle LAN 32 for display control data transmission, the various types of vehicle data (in regard of going straight, stop, turn right, turn left, going back, running speed, or the like) supplied from the in-vehicle LAN 21, to the amenity system microcontroller 39, the safety system microcontroller 42, and the DPF microcontroller 9 of the display platform section 6.

Also, the vehicle system microcontroller 36 sends, to the in-vehicle LAN 32 for display control data transmission, image layout data (described later) and image output control data (described later) which are generated by the vehicle system processor 35.

Receiving the various types of vehicle data supplied via the vehicle system microcomputer 36, the vehicle system processor 35 of the vehicle system 3 controls the vehicle system GDC 34 so as to generate image data (corresponding to images of a speedometer, tachometer, shift position, and the like). Also, the vehicle system processor 35 generates (i) image layout data for determining the sizes, positions, and overlap of images and (ii) image output control data for controlling the switching of images and layouts.

In response to an instruction from the vehicle processor 35, the vehicle system GDC 34 carries out 2-D or 3-D graphic drawing, and sends the generated image data to the in-vehicle LAN 31 for image data transmission.

The amenity system microcontroller 39 of the amenity system 4 has interfaces to vehicle-specific LANs such as CAN, LIN, and FlexRay. The amenity system microcontroller 39 receives vehicle data from the vehicle system microcontroller 36 via the in-vehicle LAN 32, and sends the supplied vehicle data to the amenity system processor 38.

Also, the amenity system microcontroller 39 sends, to the in-vehicle LAN 32 for display control data transmission, image layout data (described later) and image output control data (described later) which are generated by the amenity system processor 38.

Receiving (i) data from a DVD or TV via an interface 46 or data from GPS or audio via SCI 47 and (ii) vehicle data supplied via the amenity system microcontroller 39, the amenity system processor 38 of the amenity system 4 controls the amenity system GDC 37 so as to generate image data (corresponding to a navigation image, TV image, DVD image, and the like). The amenity system processor 38 generates image data corresponding to the navigation image, by combining map data supplied from the DVD with vehicle location information supplied from the GPS.

In addition to the above, the amenity system processor 38 generates (i) image layout data for determining the sizes and positional relations of images and (ii) image output control data for controlling the switching of images and layouts.

The amenity system GDC 37 performs 2-D or 3-D graphic drawing in response to an instruction from the amenity system processor 38, and sends the generated image data to the in-vehicle LAN 31 for image data transmission.

The safety system microcontroller 42 of the safety system 5 has interfaces to vehicle-specific LANs such as CAN, LIN, and FlexRay. The safety system microcontroller 42 receives vehicle data from the vehicle system microcontroller 36 via the in-vehicle LAN 32 and sends the vehicle data to the safety system processor 41.

In addition to the above, the safety system microprocessor 42 sends, to the in-vehicle LAN 32 for display control data transmission, the image layout data and the image output control data which are generated by the safety system processor 41.

Receiving (i) data from a front CCD, a rear CDD, and various sensors via an interface 48 and (ii) vehicle data supplied via the safety system microcontroller 42, the safety system processor 41 of the safety system 5 controls the safety system GDC 40, so as to generate image data (corresponding to various CCD images). More specifically, for example, safety confirmation such as detection of an obstacle and a white line is carried out using input images from various types of CCDs, so that alert image data of an obstacle or the like is generated. Moreover, the safety system processor 41 generates (i) image layout data for determining the sizes and positional relations of images and (ii) image output control data for controlling the switching of images and layouts. It is possible in this case to adopt a layout in which an alert image overlaps a CCD image.

The safety system GDC 40 carries out 3-D graphic drawing in response to an instruction from the safety system processor 41, and sends the generated image data to the in-vehicle LAN 31 for image data transmission.

The DPF microcontroller 9 of the instrument panel display system 1 has interfaces to vehicle-specific LANs such as CAN, LIN, and FlexRay. The DPF microcontroller 9 receives sets of image layout data and image output control data which have been supplied to the in-vehicle LAN 32 from the vehicle system microcontroller 36, the amenity system microcontroller 39, and the safety system microcontroller 42, and the DPF microcontroller 9 inputs the sets of received data to the multi display real-time processing circuit 8. Also, the DPF microcontroller 9 receives vehicle data which has been supplied to the in-vehicle LAN 32 from the vehicle system microcontroller 36, and inputs the received data to the multi display real-time processing circuit 8.

The liquid crystal panel 7 of the instrument panel display system 1 is a liquid crystal panel module including a driver IC, a backlight, and the like. The timing generator 12 generates a signal specific to the liquid crystal panel. The backlight control circuit 13 controls the backlight of the liquid crystal panel 7. The power source circuit 18 supplies power to the liquid crystal panel 7. The display data memory 15 temporarily stores image data. This display data memory 15 is also used for image processing or the like.

The liquid crystal controller 11 of the instrument panel section display system 1 outputs display data to the liquid crystal panel 7. That is, in the multi display real-time processing circuit 8, data for display is generated based on different types of image data and image layout data generated by the aforesaid systems (vehicle system 3, amenity system 4, and safety system 5) and also based on image layout information which has been set in advance. Furthermore, in the liquid crystal image quality improvement circuit (high-quality display circuit) 14, the display data is optimized (i.e. subjected to image quality improvement) in accordance with the properties of the liquid crystal panel 7, and then the display data is supplied to the liquid crystal panel 7.

Further explanations of the sections of the multi display real-time processing circuit 8 will be given below.

The standard image interface 19 receives image data supplied from an image data LAN such as MOST and IDB 1394 or a dedicated line such as LVDS, DVI, and HDMI. With reference to the image layout data supplied from the DPF microcontroller 9, the image input control section 17 writes, into a predetermined area in the display data memory 15, sets of image data supplied via the standard image interface 19.

The image output control section 16 reads out the image data from the display data memory 15, and generates display data which is used for listing images on the liquid crystal panel 7, based on the image data and the image layout data which has been supplied from the DPF microcontroller 9. The display data is supplied to the liquid crystal panel 7 via the liquid crystal image quality improvement circuit 14. As a result, in accordance with the running state of the vehicle, the images generated by the aforesaid systems (vehicle system 3, amenity system 4, and safety system 5) are displayed at particular positions on the liquid crystal panel 7 (i.e. positions in accordance with the image layout information), with the layouts generated by the aforesaid systems.

FIG. 3 shows examples of image display on the liquid crystal panel 7, when the vehicle is running, has stopped, and goes back.

Image display when the vehicle is running will be discussed first. As shown in FIG. 3, 5 images are displayed at the time of the running state. A (small) car navigation image is displayed on a first region on the left side as viewed from the driver, a left mirror CCD image is displayed on a second region provided to the right of the first region, a speedometer/tachometer image is displayed on a third region provided to the right of the second region, a fuel gauge/seatbelt/door/indicator image is displayed on a fourth region provided to the right of the third region, and a right mirror CCD image is displayed on a fifth region provided to the right of the fourth region. The display data for displaying those images is generated as described below.

First, vehicle data is supplied from the engine-related ECU 28*a* and the gear-related ECU 28*b* to the vehicle system microcontroller 36, and then the vehicle data is supplied, via the in-vehicle LAN 32, from the vehicle system microcontroller 36 to the amenity system microcontroller 39 and the safety system microcontroller 42. The vehicle data is also supplied from the vehicle system microcomputer 36 to the DPF microcomputer 9 of the display platform section 6.

The vehicle system microcomputer 36 supplies the received vehicle data (data of speed and shift position) to the vehicle system processor 35. Receiving this data, the vehicle system processor 35 recognizes that the vehicle is running straight. The vehicle system processor 35 therefore generates, by using the vehicle system GDC 34, image data of images of a speedometer and a tachometer and images of fuel gauge/seatbelt/door/indicator, and sends the image data to the in-vehicle LAN 31. Further, the vehicle system processor 35 generates (i) image layout data in regard of a layout (sizes, positional relations, overlap, and the like) of images and (ii) image output control data for controlling the switching of the images and layouts. The vehicle system processor 35 sends those sets of data to the in-vehicle LAN 32.

The amenity system microcontroller 39 sends the supplied vehicle data (data of speed and shift position) to the amenity system processor 38. Receiving this data, the amenity system processor 38 recognizes that the vehicle is running straight. The amenity system microcontroller 39 controls the amenity system GDC 37 with DVD data (map data) supplied from the interface 46, GPS information supplied from the SCI 47, and the aforesaid vehicle data, with the result that the amenity system microcontroller 39 generates image data corresponding to a navigation image. This image data is supplied to the in-vehicle LAN 31 by the amenity system GDC 37. Also, the amenity system processor 38 generates (i) image layout data regarding the layout (sizes, positional relations, overlap, and the like) of the images and (ii) image output control data for controlling the switching of the images and layouts. Those sets of data are supplied to the in-vehicle LAN 32, via the amenity system microcontroller 39.

The safety system microcontroller 42 sends the received vehicle data (data of speed and shift position) to the safety system processor 41. Receiving this data, the safety system processor 41 recognizes that the vehicle is running straight. The safety system processor 41 controls the safety system GDC 40 with the data of rear (right and left) CCDs supplied from the interface 48, so as to generate image data corresponding to the right and left CCD images. This image data is supplied to the in-vehicle LAN 31 by the safety system GDC 40. Also, the vehicle system processor 35 generates (i) image layout data regarding the layout (sizes, positional relations, overlap, and the like) of the images and (ii) image output control data for controlling the switching of the images and layouts. Those sets of data are supplied to the in-vehicle LAN 32 via the safety system microcontroller 42.

The respective sets of image data supplied from the aforesaid systems (vehicle system 3, amenity system 4, and safety system 5) to the in-vehicle LAN 31 are sent to the image input control section 17 via the standard image interface 19. On the other hand, the image layout data and image output control data, which have been supplied from the aforesaid systems to the in-vehicle LAN 31, are sent to the multi display real-time processing circuit 8 (image output control section 16 and image input control section 17) via the DPF microcontroller 9.

The sets of image data supplied to the image input control section 17 are written into a predetermined area in the display data memory 15, based on the image layout data supplied from the DPF microcontroller 9.

The image output control section 16 reads out image data from the display data memory, with reference to the image layout data and the image output control data which are supplied from the DPF microcontroller 9. The image output control section 16 then generates display data used for listing images on the liquid crystal panel 7.

In one example of the image layout, 5 images are displayed (see FIG. 3) when the vehicle is running a (small) car navigation image is displayed on a first region on the left side as viewed from the driver, a left mirror CCD image is displayed on a second region provided to the right of the first region, a speedometer/tachometer image is displayed on a third region provided to the right of the second region, a fuel gauge/ seatbelt/door/indicator image is displayed on a fourth region provided to the right of the third region, and a right mirror CCD image is displayed on a fifth region provided to the right of the fourth region.

The display data generated by the image output control section 16 is supplied to the liquid crystal panel 7 via the liquid crystal image quality improvement circuit 14, so that the image display shown in FIG. 3 (in the running state) is carried out.

When the vehicle stops, 2 images, that is, a (large) navigation image and a (large) tourist information image are displayed as shown in FIG. 3.

At this time, the amenity system processor 38 recognizes from the supplied vehicle data (zero speed) that the vehicle has stopped. The amenity system processor then controls the amenity system GDC 37 with the DVD data (map data) supplied from the interface 46 and the GPS information supplied from the SCI 47, so as to control image data corresponding to the navigation image and the tourist information image (coupled with the navigation image). Also, the amenity system processor 38 generates (i) image layout data regarding the layout (sizes, positional relations, overlap, and the like) of the aforesaid images and (ii) image output control data for controlling the switching of the images and layouts.

Via the DPF microcontroller 9, the image layout data and image output control data thus generated are supplied to the multi display real-time processing circuit 8 (image output control section 16 and image input control section 17). Based on these sets of data, a (large) car navigation image is provided on a first region on the left side as viewed from the driver and a (large) tourist information image is provided on a second region to the right of the first region, and these images are displayed on the liquid crystal panel 7 via the liquid crystal image quality improvement circuit 14.

When the vehicle is going back, 3 images, i.e. a (medium-size) left-rear CCD image, a (large) CCD image, and a (medium-size) right-rear CCD image, are displayed as shown in FIG. 3.

That is to say, the safety system processor 41 recognizes that the vehicle is going back, with reference to the supplied vehicle data (shift position (in Reverse) and speed). The safety system processor 41 then controls the safety system GDC 40 with the data supplied from the CCDs via the interface 48, and generates sets of image data corresponding to respective CCD images (left-rear CCD image, front CCD image, right-rear CCD image, and lane drift direction guide image). Also, the safety system processor 41 generates (i) image layout data regarding the layout (sizes, positional relations, overlap, and the like) of the aforesaid images and (ii) image output control data for controlling the switching of the images and layouts.

In this state, 3 images are displayed when the vehicle is going back. A (medium-size) left-rear CCD image is displayed on a first region on the left side as viewed from the driver, a (large) front CCD image is displayed on a second region provided to the right of the first region, and a (medium-size) right-rear CCD image is displayed on a third region provided to the right of the second region.

In the above-described example, the image layout data and image output control data are generated by the processors of the systems, such as the vehicle system processor 35, the amenity system processor 38, and the safety system processor 41, and the images are laid out based on these sets of data.

To meet the demand for customization of image configuration or to support a newly-added option, there is a case where it is necessary to change the image layout data and image output control data which are generated by the vehicle system processor 35, the amenity system processor 38, and the safety system processor 41.

In such a case, according to the aforesaid example, the processes carried out by the vehicle system processor 35, the amenity system processor 38, and the safety system processor 41 must be changed in accordance with a customization demand or a condition of addition of an option. It is however troublesome to change the processes performed by plural processors.

This problem can be solved in such a manner that an image layout table (not illustrated) is provided in the image output control section 16 so that image layout data and image output control data are generated on the display platform section 6 side.

In this case, in the image layout table, a lookup table is provided for each image. In this lookup table, a relationship between (i) control data such as vehicle data which is supplied via the in-vehicle LAN 32 and includes data such as speed and shift position and (ii) the image layout data and image output control data.

As a result, the vehicle data is supplied to the multi display real-time processing circuit 8 via the DPF microcontroller 9, and in the multi display real-time processing circuit 8, the image layout data and the image output control data are worked out from the control data, with reference to the image layout table. Thereafter, in a similar manner as the above-described example, display data is generated for listing the images on the liquid crystal panel 7.

An interface is provided for allowing the image layout table to be updated from the outside, in order to easily update the same. With this, it is possible to respond to a customization demand or an addition of an option only by updating the image layout table. It is therefore possible to do away with the troublesome process.

The interface for updating the image layout table may be a device for reading out a content from a storage medium such as a memory card and a hard disc, or may be a system which downloads a content via the Internet without using a storage medium.

In the example above, sets of image data are supplied from the respective GDCs via the in-vehicle LAN 31, whereas sets of layout data are supplied from the respective microcontrollers via the in-vehicle LAN 31. In the variant example, sets of image data are supplied via the in-vehicle LAN 31 whereas sets of control data are supplied from the respective microcontrollers via the in-vehicle LAN 32. To connect the systems with one another by plural transmission systems, it is preferable to use single-type standardized connectors. This makes it possible to connect the systems by using single connecting means. As a result, the connection between the systems can be easily achieved and the cost down and reuse (reduction of waste generation) can be easily achieved because it is unnecessary to use plural types of connecting means.

In the arrangement above, the instrument panel system 1 shown in FIG. 1 may include the amenity system 4 (see FIG. 1) and the safety system 5 (see FIG. 1). In this case, the instrument panel display system (display system) includes a display platform section, a liquid crystal panel, a vehicle system, an amenity system, and a safety system.

Figure 9:
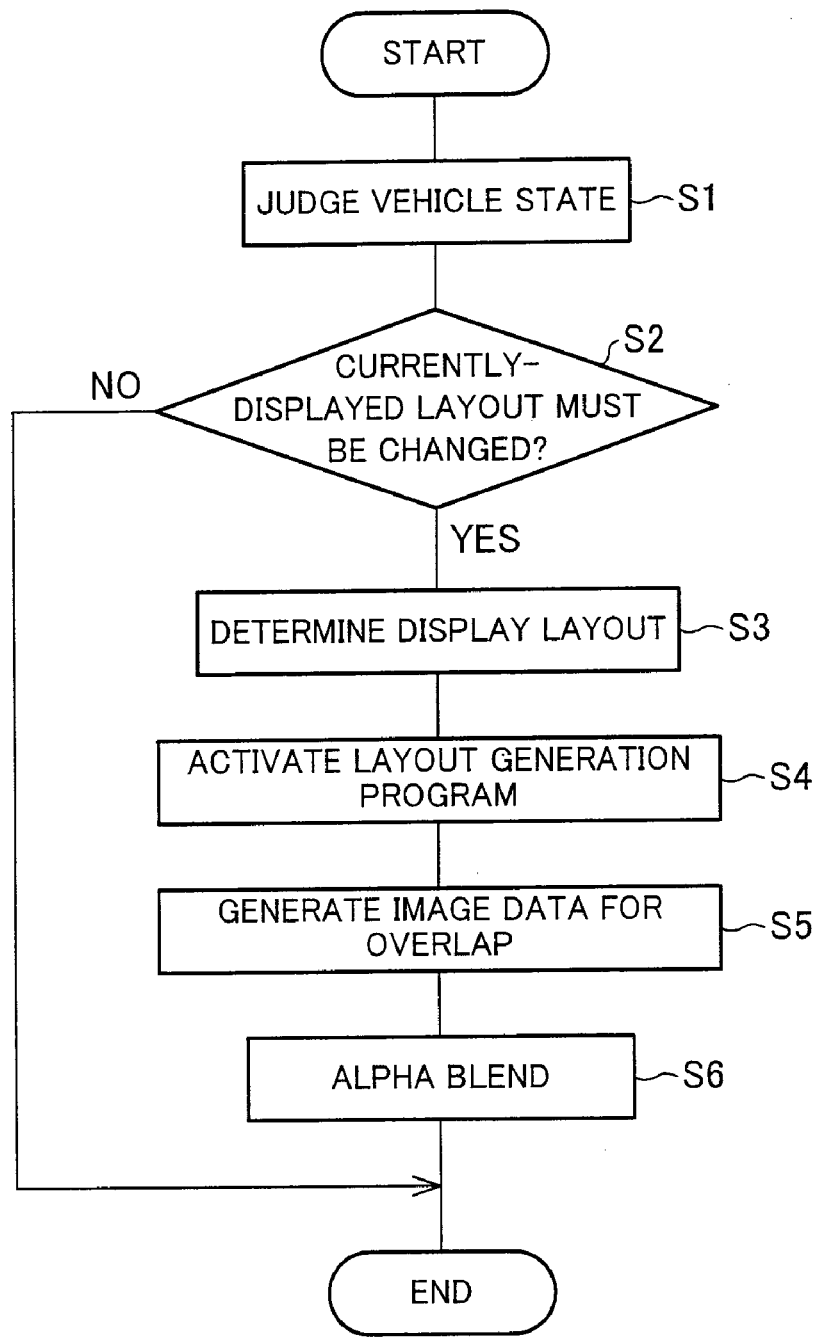
FIG. 9 is a flowchart of a display layout generation process.
Figure 10:
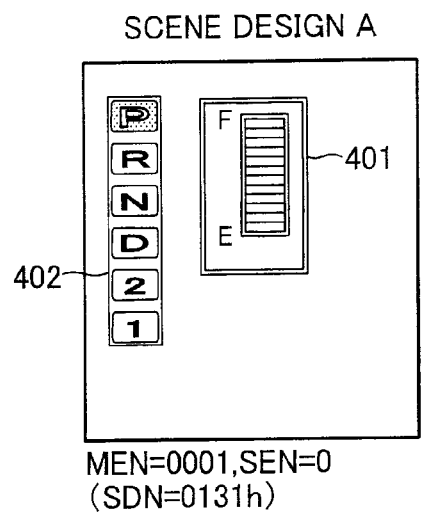
FIG. 10(a) shows an example of a result of a process in a main event of a display layout generation process performed by the display platform section of FIG. 4.
FIG. 10(b) shows an example of image display in a sub event of the main event of FIG. 10(a).
Figure 10:
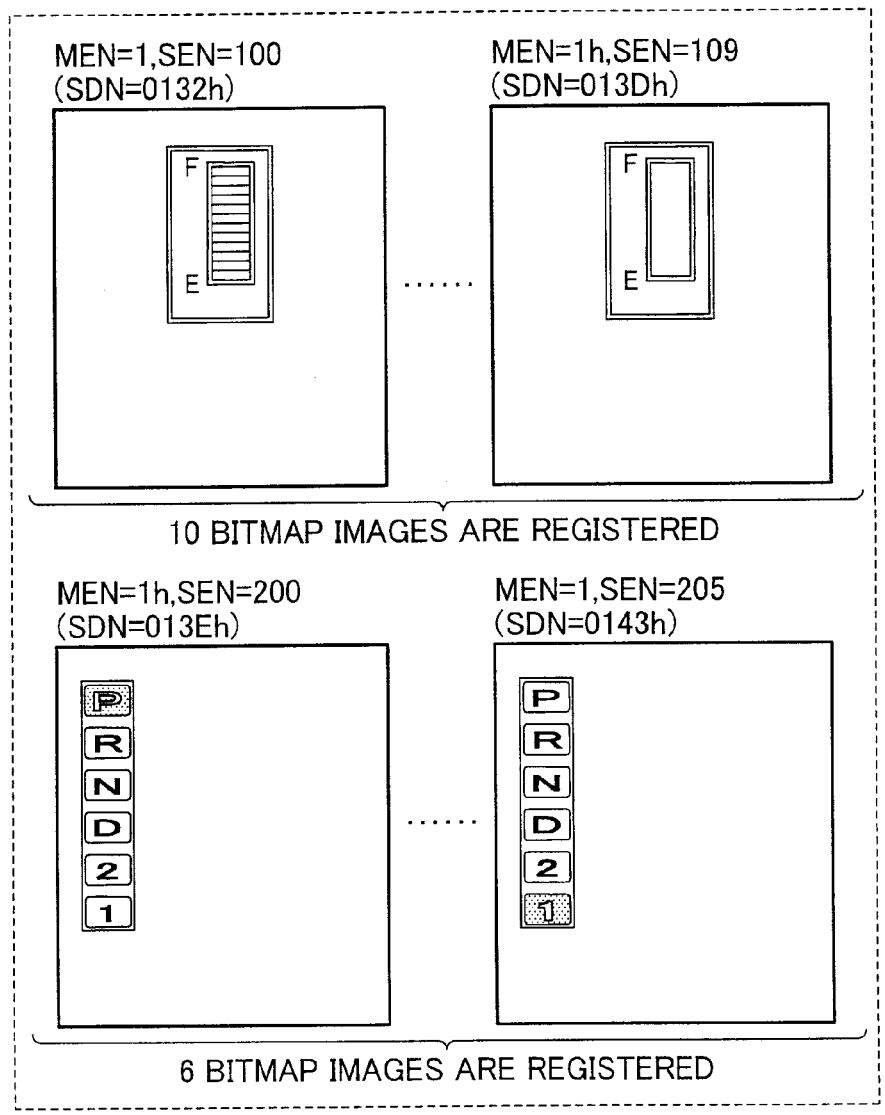

FIG. 2 shows another arrangement of the instrument panel display system of FIG. 2. In this arrangement, members having the same functions as those described above are given the same numbers. As shown in the figure, the instrument panel display system 51101 includes a display platform section 6, a liquid crystal panel 7, a vehicle system GDC 34, a vehicle system processor 35, and a vehicle system microcontroller 136. In this connection, the present arrangement (see FIG. 2)

is arranged such that the vehicle system 3 of the system shown in FIG. 1 is incorporated into the instrument panel display system 101 of the arrangement shown in FIG. 1 and the function of the DPF microcontroller 9 shown in FIG. 9 is carried out by the vehicle system microcontroller 136. The vehicle system microcontroller 136, the amenity system microcontroller 39, and the safety system microcontroller 42 are directly connected to the in-vehicle LAN 21.

The vehicle system microcontroller 136 receives sets of vehicle data (power train vehicle data and body vehicle data) supplied from the vehicle LAN 21 for vehicle data transmission, and sends the sets of data thus received to the vehicle system processor 35. In addition, to the multi display real-time processing circuit 8, the vehicle system microprocessor 136 inputs, via a dedicated line 20, the image layout data and the image output control data which are supplied from the vehicle system processor 35. Also, the vehicle system microprocessor 136 receives the image layout data and the image output control data which have been supplied to the in-vehicle LAN 32 from the amenity system microcontroller 39 and the safety system microcontroller 42, and sends these sets of data to the multi display real-time processing circuit 8, via the dedicated line 20.

The amenity system microcontroller 39 directly receives the vehicle data from the in-vehicle LAN 21 (power train in-vehicle LAN 21x and body in-vehicle LAN 21y), and sends the vehicle data to the amenity system processor 38. In a similar manner, the safety system microcontroller 42 directly receives the vehicle data from the in-vehicle LAN 21, and sends the vehicle data to the safety system processor 41.

In the present arrangement (see FIG. 2), since the function of the DPF microcontroller 9 shown in FIG. 1 is carried out by the vehicle system microcontroller 136, it is possible to reduce the number of microcontrollers required for constructing the instrument panel display system. Moreover, since the vehicle system microcontroller 136, the amenity system microcontroller 39, and the safety system microcontroller 42 are directly connected to the in-vehicle LAN 21, the in-vehicle LAN 32 for display control data transmission, which is shown in FIG. 1, is unnecessary. This makes it easy to design the hardware (wiring).

Also in the present arrangement, the instrument panel display system 101 shown in FIG. 2 may include the amenity system 4 (see FIG. 2) and the safety system 5 (see FIG. 2).

As described above, in the instrument panel display systems 1 and 101, the data for causing plural sets of information including vehicle information to be displayed as images on a single display device (liquid crystal panel 7) are generated by plural processors in a shared manner.

The burden on the processors (vehicle system processor 35, amenity system processor 38, and safety system processor 41) is reduced as compared to the conventional arrangement in which all processes are centrally carried out by a single processor. As a result, even if an amount of information to be processed is increased, it is possible to stably generate image data and layout data for performing image display for the information. Moreover, even if one of the processors malfunctions, it is possible to carry on information display by another processor. The instrument panel display system 1 can perform highly-stable image display, as described above.

The instrument panel display system 1 is provided with the processors 35, 38, and 41 for respective sets of information (vehicle information, amenity information, and safety information), and these processors generated at a (image data and layout data) for displaying the corresponding information as images. On this account, processors each having a function or capability to deal with associated information can be used as the vehicle system processor 35, the amenity system processor 38, and the safety system processor 41. This makes it possible to improve the stability in image display and reduce the manufacturing costs.

The instrument panel display system 1 is provided with the multi display real-time processing circuit 8 which integrates sets of information supplied from the respective processors so as to generate display data. Each of the processors is therefore not required to associate the data generated thereof with data generated by another processor, and hence the burden is further reduced. This makes it possible to further improve the stability in image display.

In the instrument panel display system 1, the aforesaid data includes image data and image layout data. In this manner, since the processors independently generate different types of data required for image display, customization and an addition of an option can be easily done. Moreover, since the multi display real-time processing circuit 8 is provided with a standard image interface 19 for receiving image data from the processors, customization and an addition of an option can be easily done.

In the instrument panel display system 1, the multi display real-time processing circuit 8 includes an image layout table so that image layout data is generated using the image layout table and images indicating respective sets of information are listed. As a result of this, the burden on the multi display real-time processing circuit 8 is reduced. Also, customization and an addition of an option can be easily done.

A specific example of the display platform section 6 shown in FIG. 6 will be described with reference to FIG. 4.

Figure 4:
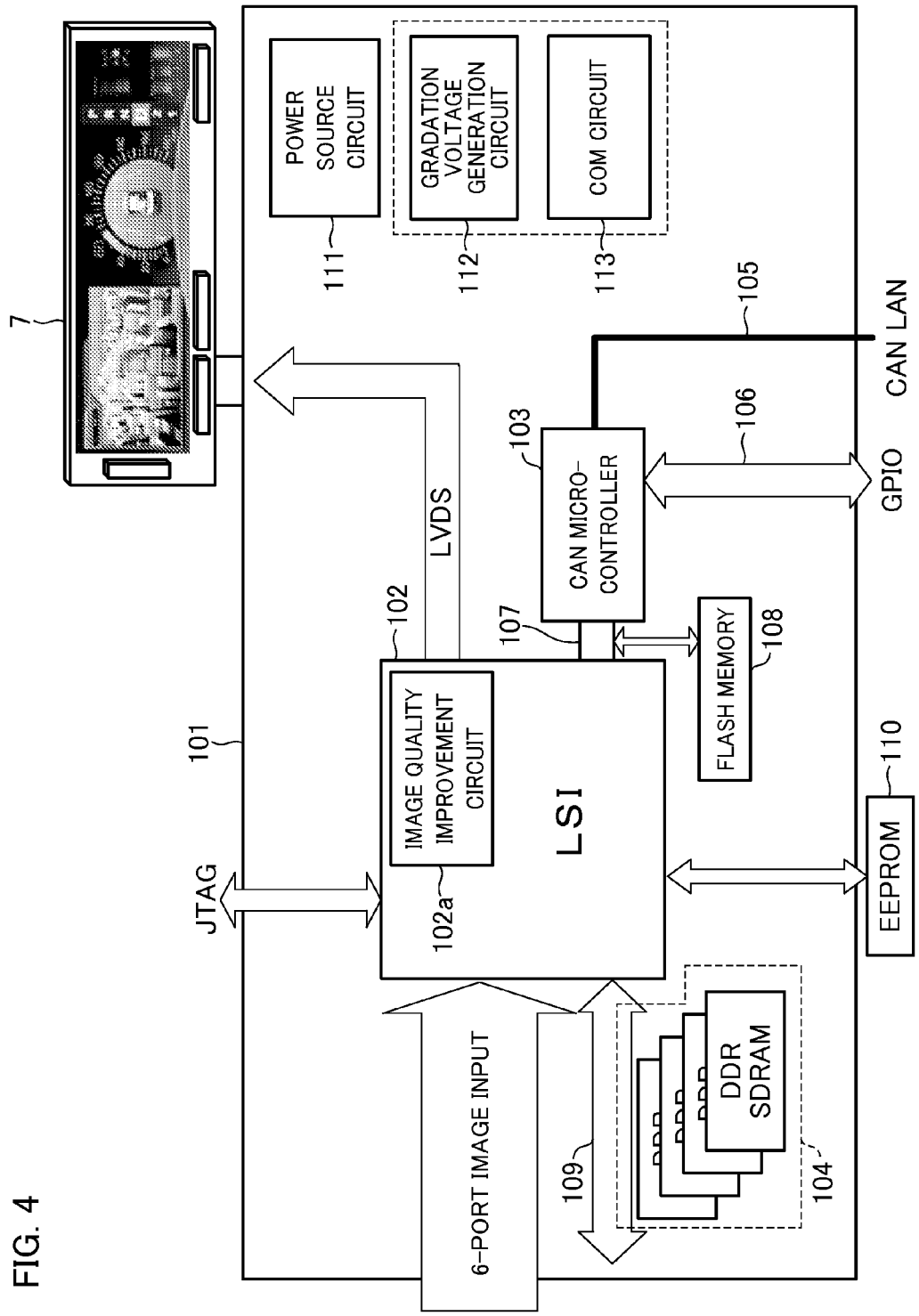
FIG. 4 is a schematic block diagram of a display platform section of the display system of the present invention.

A display platform section 101 shown in FIG. 4 includes an LSI 102 which corresponds to the liquid crystal controller 11 (see FIG. 1).

The LSI 102 is constituted by a BGA (Ball Grid Array) with 400 pins. In this LSI 102, image data is supplied through input terminals of 6 ports, and image data which has been subjected to various processes is supplied to the liquid crystal panel 7. The LSI 102 includes an image quality improvement circuit 102a corresponding to the liquid crystal image quality improvement circuit 14 (see FIG. 1). With this image improvement circuit 102a, the image data is subjected to image quality improvement before being supplied to the liquid crystal panel 7.

The LSI 102 is connected to, via a CPU bus 107 and a CPU bus 109, (i) a CAN (Controller Area Network) microcomputer 103 corresponding to the DPF microcomputer 9 (see FIG. 1) and (ii) an image memory 104 which is constituted by four 32-bit DDRSDRAMs and corresponds to the display data memory 15 (see FIG. 1). The bit width of this image memory 104 may be 8 bits, 16 bits, or more. The types of the image memory may be DDR2, XDR, or the like.

The CAN microcontroller 103 is control means which obtains state information of the vehicle via a single-system CAN LAN 105 corresponding to the in-vehicle LAN 31 (see FIG. 1), so as to control the processing of the image data carried out by the LSI 102. The CAN LAN 105 may be plural (2, 3, or more) systems in order to receive inputs from other information systems of the vehicle. While obtaining vehicle information via the CAN LAN 105, the CAN microcontroller directly obtains vehicle information from a GPIO (General-Purpose Input/Output) 106. This GPIO 106 is directly connected to members such as gears, indicators, and a device for generating alarm sound such as a buzzer and a speaker.

The image memory 104 is constituted by 4 DDRSDRAMs. Image data is written or read out into/from the image memory 104 by the LSI 102, as circumstances demand.

To the general-purpose CPU bus 107 between the LSI and the CAN microcontroller 103, a flash memory 108 is connected. This flash memory 108 stores data of still images and programs for, for example, simulation of the instrument panel display system.

The programs and the data of still images, which are stored in the flash memory 108, are read out by the LSI 102, as circumstances demand.

The LSI 102 is connected to an EEPROM 110 to which, for example, an error at the time of executing a simulation program is written as a log. In other words, the LSI 102 performs fault diagnosis with reference to the log which has been written into the EEPROM 110. The LSI 102 inputs and outputs debug information of the inside of the LSI 102 by JTAG (Joint Test Action Group).

Being similar to the display platform section 6 shown in FIG. 1, the display platform section 101 is provided with: a power source circuit 111 corresponding to the power source circuit 18; and a gradation voltage generation circuit 112 and a COM circuit 113 corresponding to the timing generator 12. Also, although being not illustrated, a circuit for controlling the backlight of the liquid crystal panel 7, which corresponds to the backlight control circuit 13, is provided.

Figure 5:
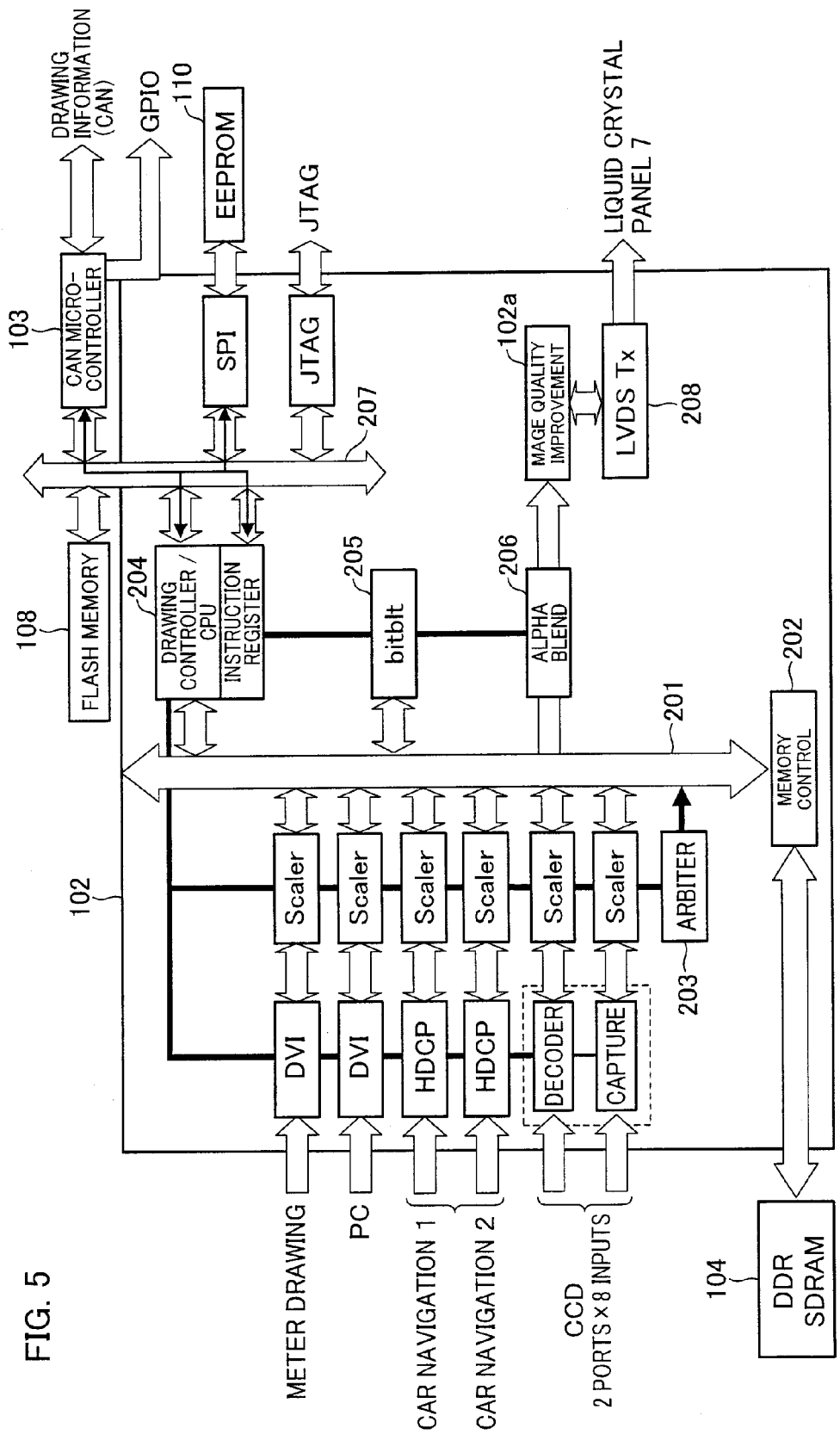
FIG. 5 is a block diagram showing details of an LSI in the display platform section of FIG. 4.

The following will describe details of the LSI 102 with reference to FIG. 5.

In the above-described LSI 102, 6-port image data is supplied to an internal memory bus 201 via a Scaler.

More specifically, image data for drawing meters is supplied via a DVI (Digital Visual Interface), and is enlarged or reduced to a predetermined size by the Scaler. Then the image data is supplied to the memory bus 201. In a similar manner, image data from a PC (Personal Computer) is supplied via the DVI, and enlarged or reduced to a predetermined size by the Scaler. The image data is then supplied to the memory bus 201.

There are two systems of image data supplied from a car navigation. The image data of both systems is supplied via a HDCP (High-bandwidth Digital Content Protection) and enlarged or reduced to a predetermined size by the Scaler, and then the image data is supplied to the memory bus 201.

Image data supplied from CCD cameras is two-system NTSC (National Television System Committee) signals. Such signals are supplied to the Scaler via a decoder and a capture, and enlarged or reduced to a predetermined size by the Scaler. The signals are then supplied to the memory bus 201.

As described above, there are two systems of input from CCD cameras. Since each system can deal with 8 inputs, the LSI 102 can handle sets of image data from 16 CCD cameras in total. This can be achieved by using 16 capture buffers. Details of the input of image data from the CCD cameras will be given later.

Each of the input interfaces DVI and HDCP may be other interfaces such as LCDS, HDMI (High-Definition Multimedia Interface), GVIF (Gigabit Video Inter-Face), digital RGB, analog RGB, and D1/D2/D3/D4.

The inputs from the CCD cameras may be typical television inputs. The television standard may be PAL or SECAM rather than NTSC.

The image data supplied to the memory bus 201 is temporarily stored in the DDRSDRAM in the image memory 104, by a memory control section 202 which performs memory control in the memory bus 201. When the memory control section 202 controls the writing of image data into the image memory 104, the arbitration of memory access from each Scaler to the memory bus 201 is carried out by an arbiter 203.

The memory bus 201 is connected to a drawing controller 204 serving as a drawing controller, a bitblt 205 for image transmission, and an alpha blend 206 for overlapping images.

The drawing controller 204 is further connected to a control bus 207 which is controlled by the CAN microcontroller 103.

The control bus 207 is connected to a flash memory 108 for initial data, an SPI (Serial Peripheral Interface) for writing into the EEPROM 110 information for a log (e.g. parameter setting information), which is supplied via the drawing controller 204, and a JTAG for sending to a JTAG a signal for debug.

The alpha blend 206 is connected to the image quality improvement circuit 102a, and image data having been subjected to the alpha blend process is subjected to image quality improvement. The image data after the image quality improvement is supplied to the liquid crystal panel 7 via a LVDSTX (transmitter) 208.

Figure 6:
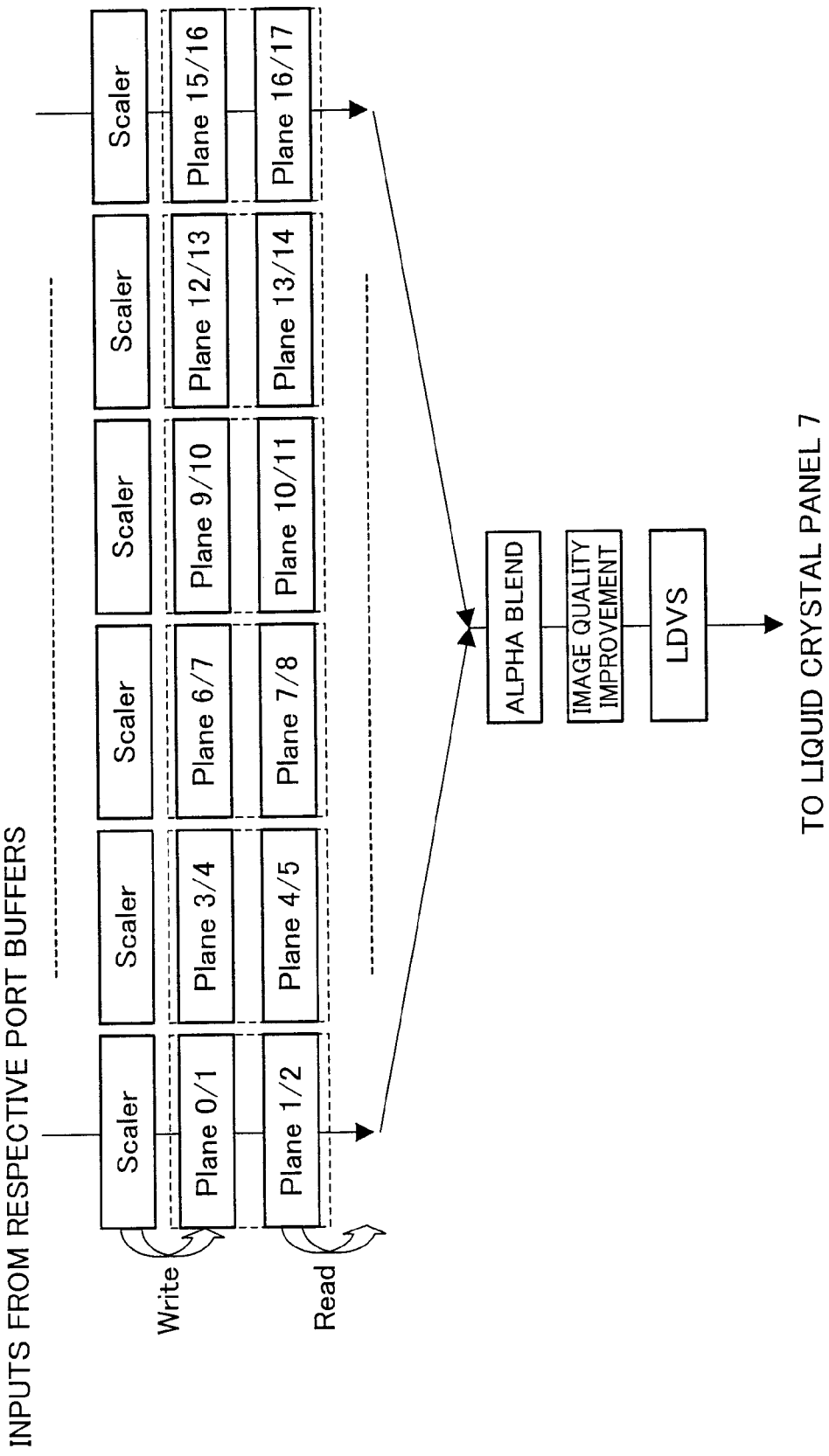
FIG. 6 shows the transition of memory use in the LSI of FIG. 5.

The following will describe transition of image data in the image memory 104 by the LSI 102, with reference to FIG. 6.

The image data having been converted to have a predetermined size by each scalar is written into a port memory 0 or 1 (top side) which is provided in units of ports. Simultaneously, data corresponding to a window to be displayed is read out in units of Planes from each port memory Plane 1 or 2 (bottom side), and simultaneously a blend process (alpha blend) corresponding to overlapped windows and alpha values is conducted.

The image data having been alpha-blended is supplied to the image quality improvement circuit on the subsequent stage, and then supplied to the liquid crystal panel 7 via the LVDS. Instead of this LVDS, digital RGB, RSDS, analog RGB, or the like may be adopted.

The aforesaid top side and bottom side indicate that 3 Frames (corresponding to Planes 0/1/2 in FIG. 6) including a buffer of a synchronous processing are sequentially switched after the completion of reading/writing (i.e. reading and writing cannot be simultaneously done to a single Flame). In this case, it is assumed that the speed of reading is equal to or higher than the speed of writing.

Figure 7:
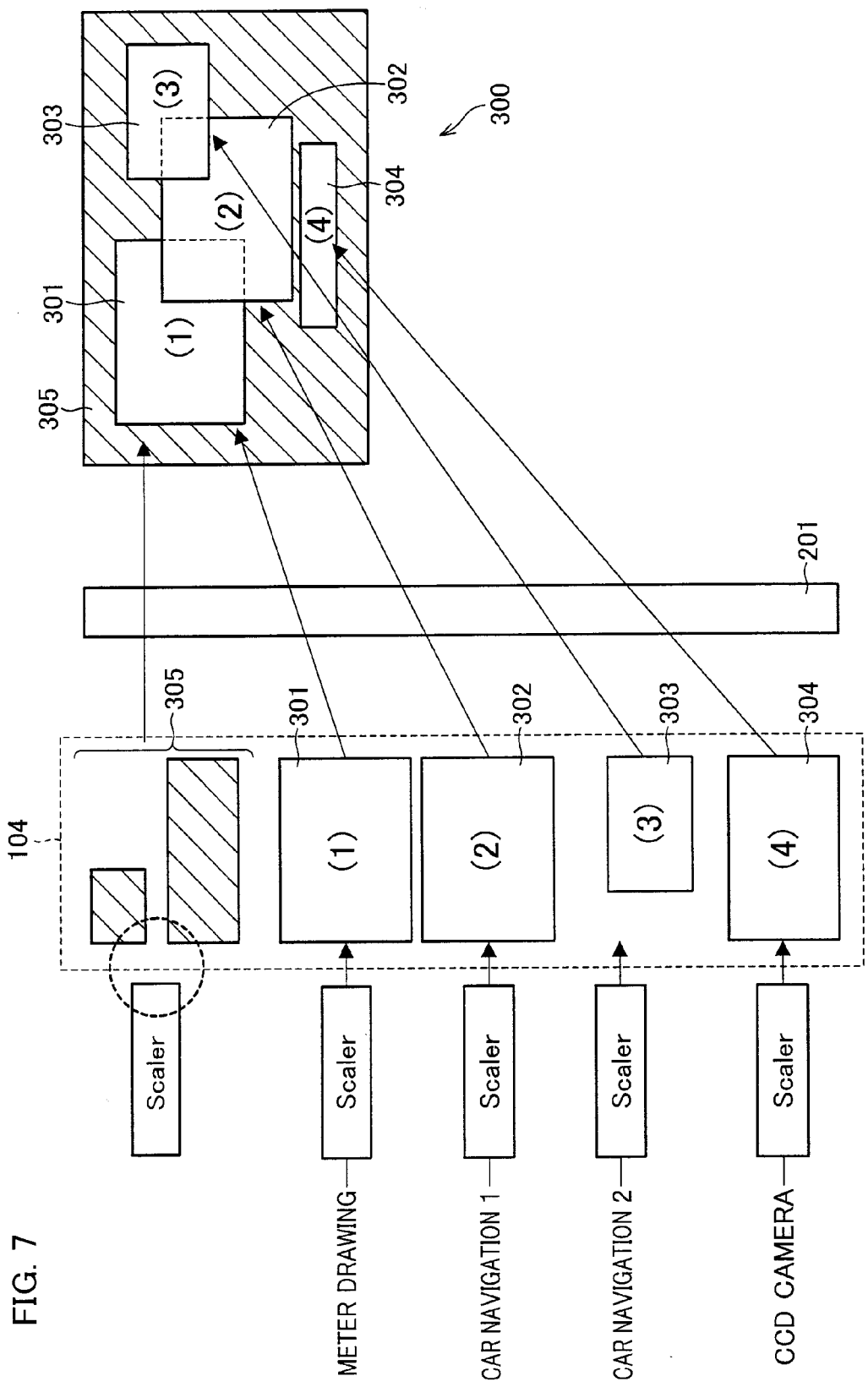
FIG. 7 outlines an alpha blend process performed by the display platform section of FIG. 4.
Figure 8:
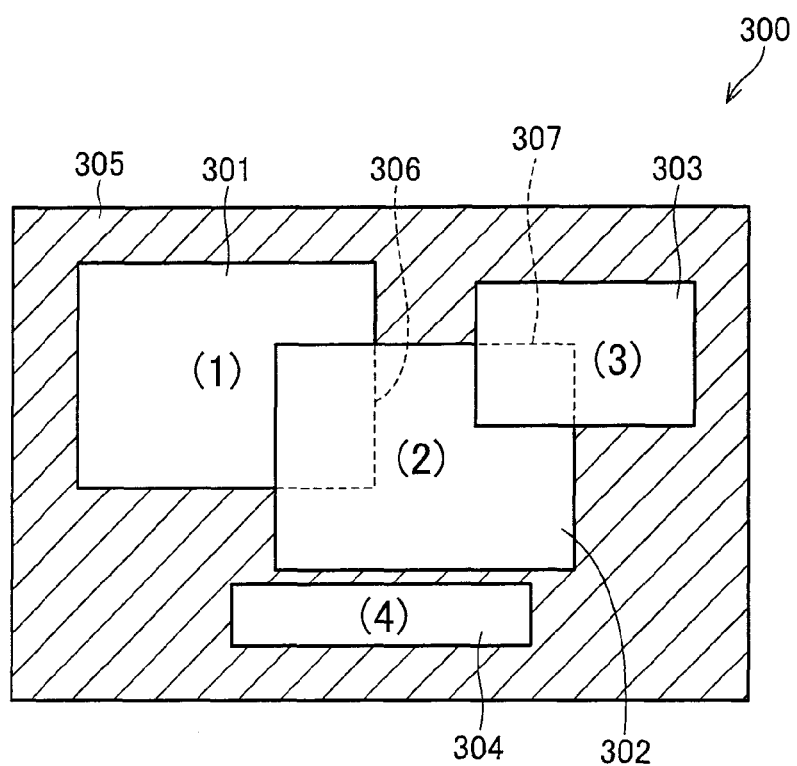
FIG. 8 shows a display image with the display layout actually generated by the alpha blend process.

FIG. 7 schematically shows the flow of a process of overlapping images. FIG. 8 shows an image obtained by the overlap process of FIG. 7.

The process of overlapping images will be outlined below with reference to FIG. 7.

On the side from which input to the memory bus 201 is carried out, there are sets of image data supplied via respective ports of the LSI 102, which are meter drawing information, car navigation 1 information, car navigation 2 information, and CCD camera information. These sets of information are dealt with as moving images, and are converted to have desired display sizes by the Scalers. The display sizes are determined in accordance with a control signal supplied from the CAN microcontroller 103.

The meter drawing is converted to a first image 301 corresponding to an window (1) in the figure, the car navigation 1 is converted to a second image 302 corresponding to an window (2) in the figure, the car navigation 2 is converted to a third image 303 corresponding to an window (3) in the figure, and an image from a CCD camera is converted to a fourth image 304 corresponding to an window (4) in the figure. The converted images are temporarily stored in the image memory 104. A still image 305 such as a background image has been subjected to display size conversion by the Scaler and bitblt 205, and has been stored in the image memory 104 in advance.

In the meanwhile, on the output side of the memory bus 201, the sets of image data stored in the image memory 104 are alpha-blended and are read out, so that a single image 300 in which windows overlap with one another is generated. The alpha blend is, as shown in FIG. 8, a process to overlap windows in units of pixels.

The image 300 shown in FIG. 8 has parts where displayed images do not overlap one another and parts where portions of images overlap with one another, and the overlapped portions have been alpha-blended. For example, a portion 306 where the first image 301 overlaps the second image 302 and a portion 307 where the second image 302 overlaps the third image are alpha-blended. In the present case, the overlapping portion of the second image 302 is made to be transparent in order to show the overlapping portion of the first image 301 and the overlapping portion of the third image 303.

It is possible to set (i) the alpha blend in units of pixels and (ii) a transmissive color, for plural moving/still images, e.g. two images and for only still images, e.g. four images. The settings are carried out by the user.

The windows can be freely provided and can be overlapped with one another without the alpha blend. When the overlap with the alpha blend is carried out, two images are displayed in a transparent manner (both of the images are transparent). When the overlap is carried out without the alpha blend, two images are displayed in a non-transparent manner. In other words, when the alpha blend is not carried out, two images look like two nontransparent sheets which overlap with one another.

The aforesaid process of overlapping images will be described with reference to the flowchart in FIG. 9.

First, the CAN microcontroller 103 judges the states of the vehicle (S1). In the present case, the CAN microcomputer 103 judges the states of the vehicle (car) with reference to information (drawing information) indicating the state of the car, which information is supplied from each LAN. The drawing information includes, for example, instruction information which instructs to display a navigation image or to display a speedometer. The states of the vehicle include all kinds of information related to the vehicle, such as speed, engine revolutions, oil quantity, open/close of doors, turning on/off of air conditioner, and turning on/off of audio.

Subsequently, the CAN microcontroller 103 determines if it is necessary to change the currently-displayed layout (S2). In this case, the CAN microcontroller 103 carries out the determination with reference to the states of the vehicle judged in the step S1.

The entire process finishes if the CAN microcontroller 103 determines in the step S2 that the change of the layout is not necessary. If the CAN microcontroller 103 determines that the change of the layout is necessary the display layout of an instrument panel display image is determined in accordance with the judged states of the vehicle (S3).

Thereafter, the CAN microcontroller 103 activates a layout generation program (S4). In this case, the CAN microcontroller 103 activates a layout generation program which (i) corresponds to the display layout thus determined, (ii) has been read out from the flash memory 108 in advance, and h(iii) as been loaded onto a DRAM. The flash memory 108 stores, for respective display layouts, layout generation programs for generating patterns of display layouts shown in FIG. 3. The programs are loaded onto the DRAM at the time of the boot.

More specifically, in the steps S1-S4, the CAN microcontroller 103 determines which display layout is adopted, with reference to the obtained drawing information, and then activates a layout generation program for generating the selected display layout. Each layout generation program at least includes: information regarding types of images to be displayed (e.g. a navigation image, a moving image such as a speedometer, and a still image such as a background image); information regarding the sizes of images to be displayed (e.g. 640 pixels×480 pixels); information regarding the positions of images to be displayed (e.g. the location of the upper-left corner of an image and the aspect ratio of an image); the ratios of the alpha blend of images to be displayed (e.g. a navigation image and a speedometer are alpha-blended in the ratio of 60% and 40%).

For example, each layout generation program generates a layout with reference to the following table 1 showing alpha blend ratios.

TABLE 1

| Window Numbers of Images | alpha blend Values |
| --- | --- |
| (1) | 20% |
| (2) | 40% |
| (3) | 30% |
| (4) | 100% |

When the alpha values of the images in the respective windows are set in line with Table 1, the images shown in FIG. 8 are alpha-blended as follows. In the following description, only the window numbers are mentioned.

As to the window (1) and a the background 305, the degree of transparency of the window (1) is 20% whereas that of the background 305 is 80% (=100−20).

As to the windows (1) and (2) and the background 305, the degree of transparency of the window (1) is 20%, that of the window (2) is 40%, and that of the background 305 is 40% (=100−20−40).

As to the window (2) and the background 305, the ratio of transparency of the window (2) is 40% whereas that of the background 305 is 60% (=100−40).

As to the windows (2) and (3) and the background 305, the ratio of transparency of the window (2) is 40%, that of the window (3) is 30%, and that of the background 305 is 30%.

The window (4) is not transparent because the alpha blend value thereof is 100%.

As shown in FIG. 8, the description above deals with a case where two images are overlapped with one another. When three or more images overlap, there are following two methods for calculating the alpha blend values. That is, it is possible to implement a method in which alpha blend values of higher two are serially calculated or a method in which alpha blend values of all images are proportionally calculated.

In the aforesaid step S4, based on the information which is included in the layout generation program and indicates the size of the image, the CAN microcontroller 103 instructs, via the drawing controller 204, a Scaler to enlarge or reduce to a predetermined size an image supplied from the DVI, HDC, or the capture buffer. In response, the Scaler enlarges or reduces the image to the instructed size and outputs the image to the DDRSDRAM of the image memory 104.

Also, based on the layout generation program, the CAN microcontroller 103 outputs to the bitblt 205 a control signal for obtaining image data from the image memory 104. Moreover, the CAN microcomputer 104 outputs to the bitblt 205 a control signal for generating an image in which images are provided at predetermined positions, based on the information which is included in the layout generation program and relates to the positions of the images.

Then on the LSI 102 side, the bitblt 205 generates data for overlapping images (S5). That is, with reference to the control signal supplied from the CAN microcontroller 103, the bitblt 205 generates image data for the overlap of windows and outputs the generated image data to the alpha blend 206. For example, in FIG. 7 which illustrates the process to overlap windows, the following sets of image data are read out from the respective faces and generated: first image data which occupies the entirety of a window (1); second image data which occupies the entirety of a window (2); third image data which occupies the entirety of a window (3); and fourth image data which occupies the entirety of a window (4). The bitblt outputs those sets of image data thus generated to the alpha blend 206.

Subsequently, the alpha blend 206 carries out the alpha blend process (S6). More specifically, the alpha blend 206 carries out an alpha-blend overlap process of obtained plural sets of image data, based on the ratios of the alpha blend informed by the CAN microprocessor 103. As a result, for example, data of a single image shown in FIG. 8 is generated and the layout generation program is terminated. According to another method, sets of images data of respective faces are read out and an alpha blend process is simultaneously carried out, so that data of a single image is generated.

Thereafter, the image data is subjected to predetermined processes in the image quality improvement 102a and the LCDSTx 208, and then supplied to the liquid crystal panel 7. In response, the liquid crystal panel 7 displays an image based on the supplied image data.

After the completion of the generation of the layout as above, the liquid crystal panel 7 displays moving images and still images. The generation of the layout in the liquid crystal panel 7 is assumed as a main event, whereas changes in image display in each image on the layout is assumed as sub events.

Based on the layout generated in the main event, the images are provided on the liquid crystal panel 7. In the sub events, the images displayed in the respective windows are changed.

For example, in a case of a scene design A with which a fuel gauge and a shift indicator are provided at predetermined positions, FIG. 11(a) indicates the main event of the scene design A, whereas FIG. 11(b) shows sub events of the scene design A.

In the scene design A shown in FIG. 11(a), a fuel gauge 401 and a shift indicator 402 are displayed as components constituting the scene design A. FIG. 11(b) shows that 10 (bitmap) images for changing the display of the fuel gauge 401 are registered and 6 (bitmap) images for changing the display of the shift indicator 402 are also registered.

Figure 12:
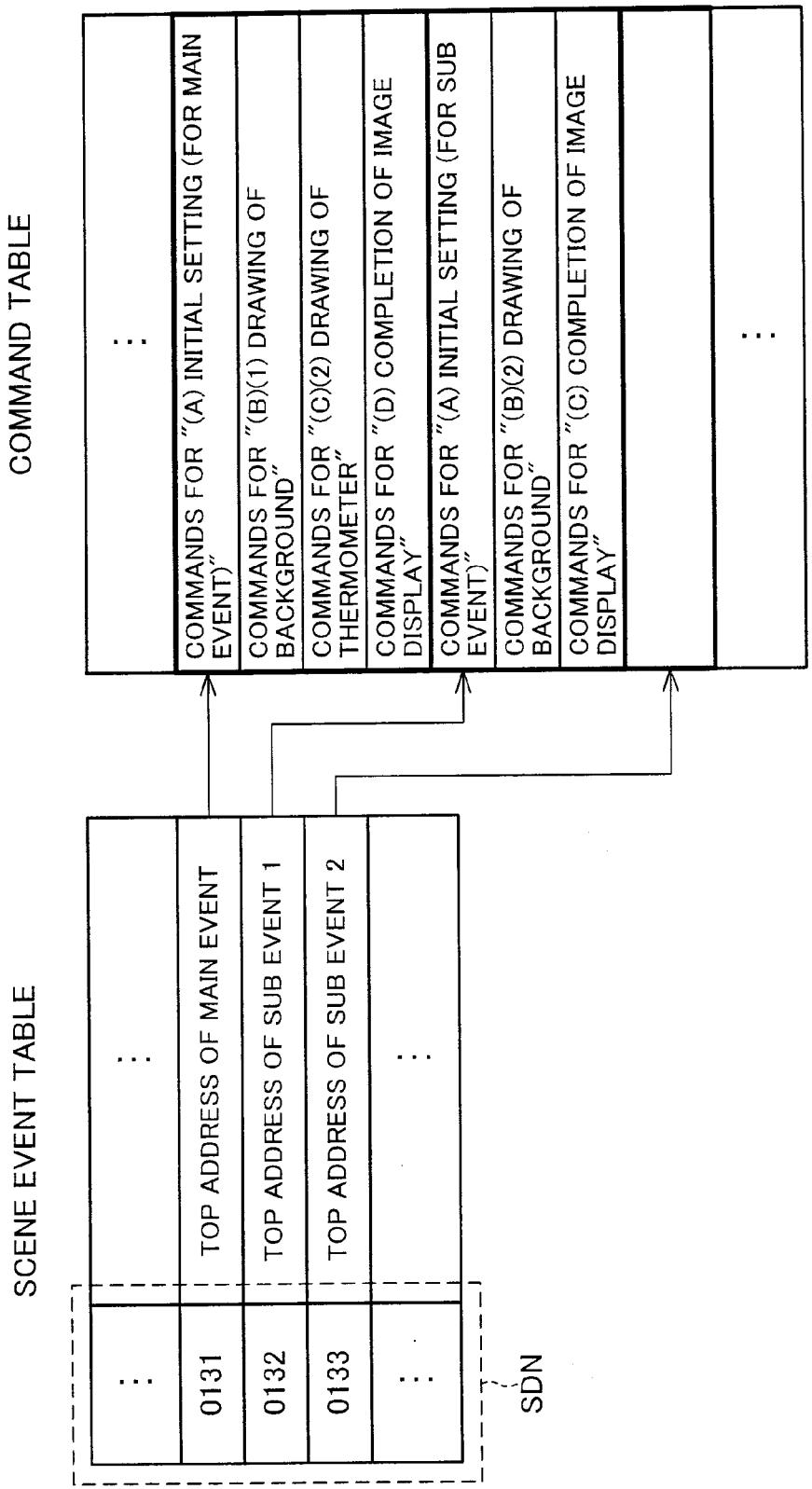
FIG. 12 shows the relationship between a scene event table and a command table, in the display layout generation process.

FIG. 12 shows a table in which components used in sub events are associated with sets of information determined in the main event.

For example, FIG. 12 shows that 6 types of image files are registered in association with the lighting states of the shift indicator 402 indicating the shift indicator ECU, 10 types of image files are registered in association with the scale mark 8 of the fuel gauge 401 indicating the fuel ECU, and 2 types of image files are registered in association with the lighting states of the indicator 403 indicating the indicator ECU. These image files have component numbers (SEN), respectively. For example, SEN=200 is allocated to the image file "shift indicator 1.bmp" indicating that the shift indicator ECU indicates "P". In other words, by specifying this SEN, it is possible to call the image file corresponding to the SEN.

In the main event, provided that the scene design A shown in FIG. 11(a) has been generated, an appropriate sub event among the sub events shown in FIG. 11(b) is executed. In this case, since the shift indicator ECU indicates "P" in the main event, the sub event to read the image file corresponding to SEN=200 is selected among 6 types of image files, and the selected sub event is executed. In the meanwhile, since the fuel ECU indicates "Full" indicating fill-up, the sub event to read the image file corresponding to SEN=100 is selected among 10 types of image files, and the selected sub event executed.

In the scene design A, the shift indicator ECU and the fuel ECU execute sub events corresponding to the changes, so that the images in the scene design A are changed.

Each scene design is generated with reference to a scene design table shown in FIG. 13. The scene design numbers (SDN) of the scene design table are associated with respective commends in a command table.

A scene design is specified by a MEN (Main Event Number) indicating the layout of a component and a SEN (Sub Event Number) indicating the number of the component. A MEN and a SEN are selected by the user. A scene design number SDN of each scene design is set as a combination of a MEN and a SEN. A main event indicates that the layout is switched when the vehicle is running, has stopped, and is going back, as shown in FIG. 3. Event numbers, i.e. MENs, are allocated to the respective layouts. Sub events indicate that the looks of the components (e.g. shift position and fuel amount) are changed.

Figure 14:
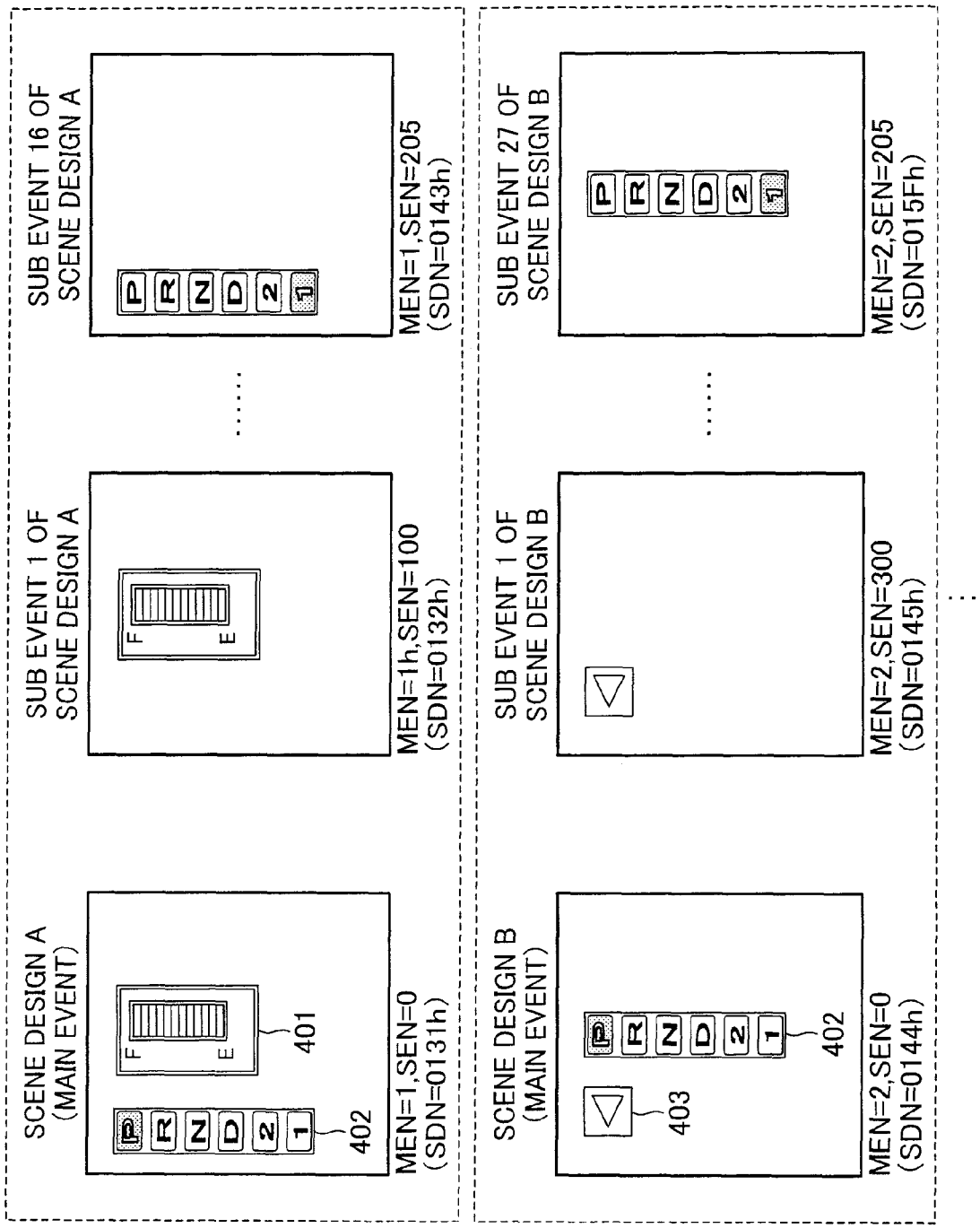
FIG. 14 shows the relationship between a main event and sub events in each scene design.

More specifically, a table shown in FIG. 14 is used. That is, a combination of a MEN and a SEN is used as an expanded scene design number (expanded SDN). The LSI 102 having received an expanded SDN from the CAN microcontroller 103 converts the expanded SDN into a scene design number SDN which is actually used, and the LSI 102 executes an event.

As described above, in the display system of the present invention, the layout displayed on the liquid crystal display panel 7 is controlled in accordance with each scene design. That is, as shown in FIG. 15, scene designs in which a main event is associated with sub events are set in advance, and a program corresponding to each scene design is executed.

Figure 16:
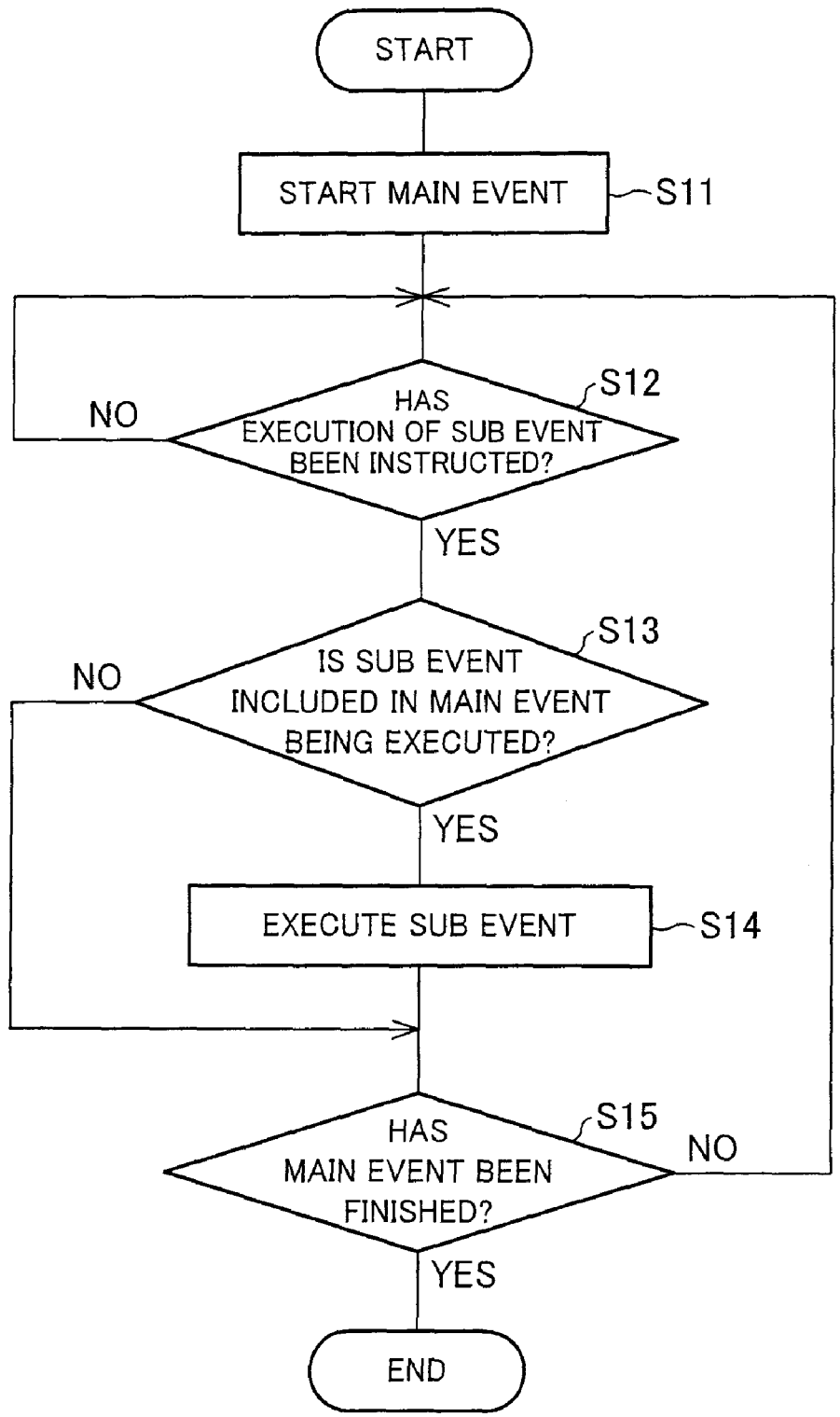
FIG. 16 is a flowchart of a display layout generation process for a scene design.

For example, the source data for generating the above-described scene design A is arranged as shown in FIG. 16. According to this figure, the drawing (a) of the background and the drawing (b) of the fuel gauge are carried out in the main event, whereas the drawing (c) of details of the state of the fuel gauge is carried out in the sub event.

The following will describe the flow of a layout generation process when a sub event is added to a main event, with reference to FIGS. 18(a) and 18(b) and the flowchart in FIG. 17.

First, the LSI 102 executes a main event in accordance with an instruction from the CAM microprocessor 103, so as to display a scene design on the liquid crystal panel 7 (S11).

The LSI 102 then determines whether a control signal supplied from the CAN microcomputer 103 includes an instruction to execute a sub event (S12). If such an instruction to execute a sub event is included, it is determined whether the instructed sub event is included in the scene design which is currently displayed on the liquid crystal panel 7 (S13).

In the step S13, the LSI 102 determines whether the SEN which is included in the control signal supplied from the CAN microcontroller 103 is identical with the SEN in the scene design which is currently displayed.

For example, when a SEN not included in the currently-displayed scene design is supplied, i.e. when a SEN=300 indicating an indicator, which SEN is not included in the scene design A, is supplied as shown in FIG. 18(a), the LSI 102 determines that the supplied SEN does not exist in the scene design A and hence does not process the same. In other words, sub events which do not exist in the currently-displayed scene design A are not processed.

When an SEN included in the currently-displayed scene design is supplied, i.e. when a SEN=0132h of a shift indicator, which SEN is included in the scene design A is supplied as shown in FIG. 18(b), the LSI 102 executes the sub event of the shift indicator of the scene design A, so that a part of the image display is updated.

As described above, in the liquid crystal panel 7, sets of information to be displayed are classified into a main event and sub events and only necessary parts of image display are changed. With this, it is possible to simplify the layout change process and reduce an amount of information in regard of layouts, and hence memory amount required in the display system is small and the downsizing is achieved.

The memory amount above is small in comparison with memory amount required for rewriting the whole screen each time, i.e. in case where partial rewriting of the screen is not carried out. In other words, the memory amount is smaller than memory amount required for rewriting the whole screen each time. For example, memory amount in a case where a sub event is not adopted is calculated by (number of main events+number of sub events)×memory amount for whole screen. Memory amount in case where a sub event is adopted is calculated by number of main events×memory amount of whole screen+number of sub events×memory amount for sub event images. In this case, provided that memory amount of images rewritten in a sub event is, for example, 20% of the whole screen, the memory amount is reduced by the number of sub events×(100%-20%).

In the above-described instrument panel display system 1, the multi display real-time processing circuit 8 functioning as display control means is provided with an image layout table. Image layout data is generated using the image layout table and images indicating respective sets of information are listed, so that the burden on the multi display real-time processing circuit 8 is reduced.

Instrument panel display images includes still images and moving images, and are displayed at display positions determined by an image layout. These sets of image data are, as described above, generated in a shared manner by the processors (of the vehicle system 3, the amenity system 4, and the safety system 5), and are supplied to the display platform section 6 via the in-vehicle LAN 31.

To the display platform section 6, images to be displayed as instrument panel display images are supplied from the processors. On this account, the communications traffic on the in-vehicle LAN 31 increases as the number of images to be displayed increases, and hence the burden on the network also increases.

In the description above, the image layout data of an instrument panel display image is generated not on the processors side but on the display platform section 6 side. On this account, such image layout data does not pass through the in-vehicle LAN 31.

The communications traffic on the in-vehicle LAN 31 can be reduced in such a manner that image data of still images constituting an instrument panel display image is dealt with on the display platform section 6 side. The still images are, for example, the background image in a meter part (the meter in the meter part is a moving image) in a case of a speedometer, and the background image of a fuel gauge.

Since it is difficult to store moving images in the display platform section 6, they must be generated by the processors. On the other hand, still images can be stored on both sides without any problems. To reduce the communications traffic on the in-vehicle LAN 31, still images are preferably stored in the display platform section 6.

Figure 18:
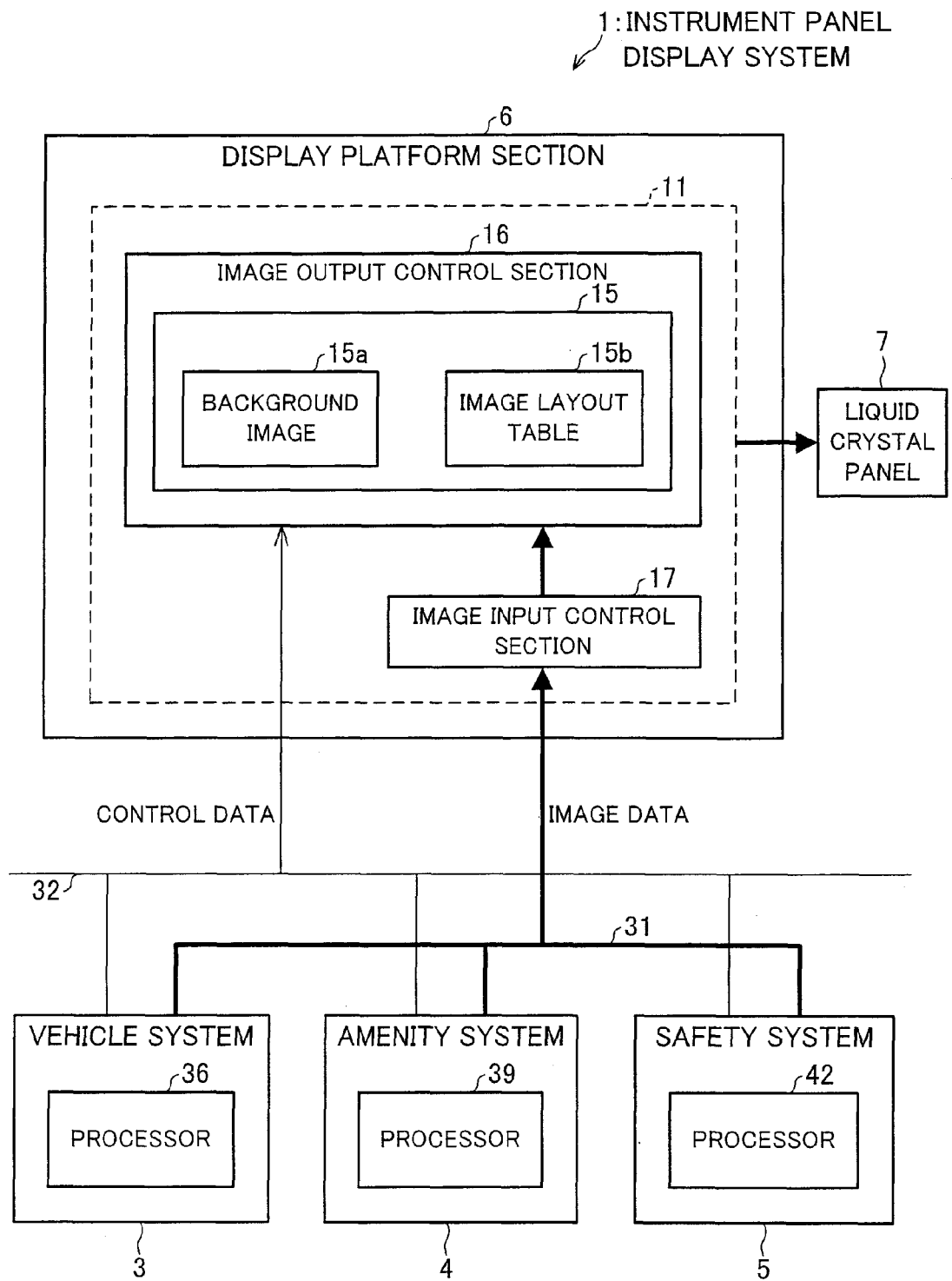
FIG. 18 is a schematic block diagram of a further instrument panel display system of the present invention.
Figure 19:
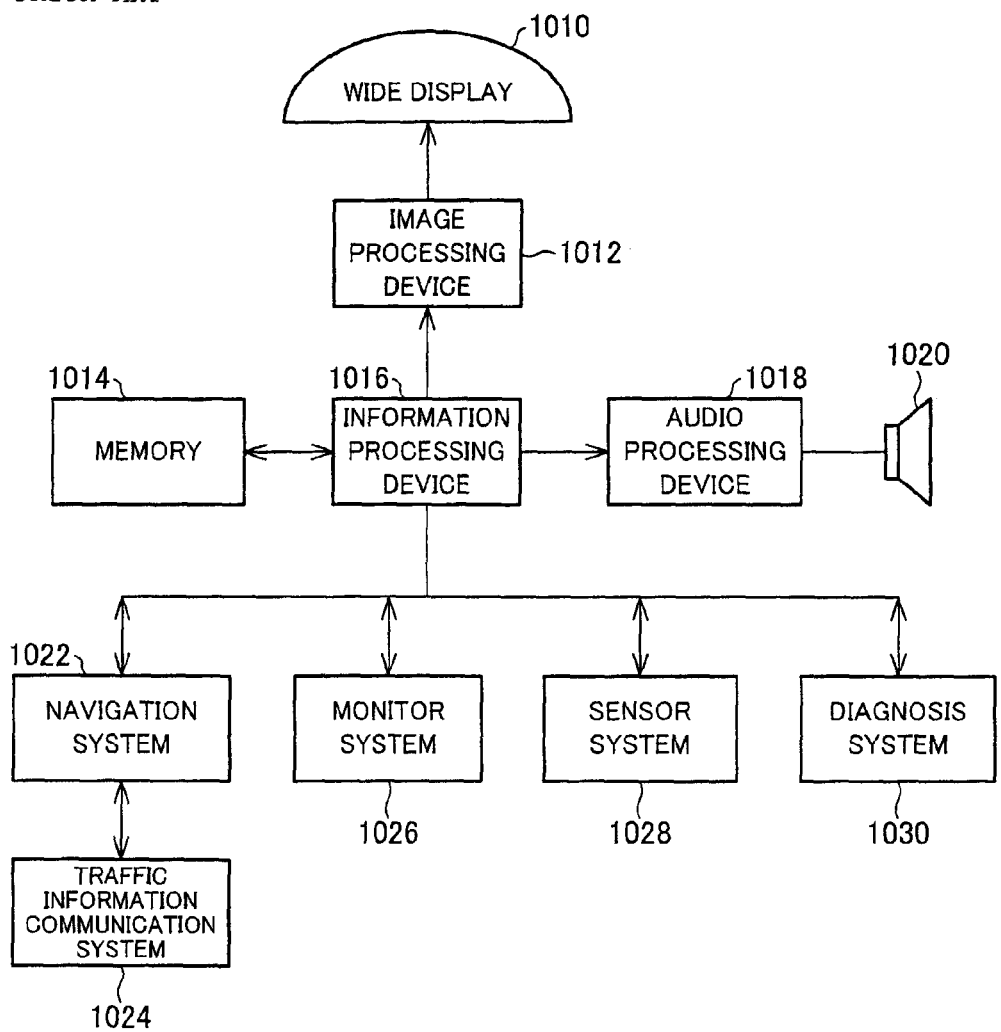
FIG. 19 is a block diagram of a conventional instrument panel display system.
Figure 20:
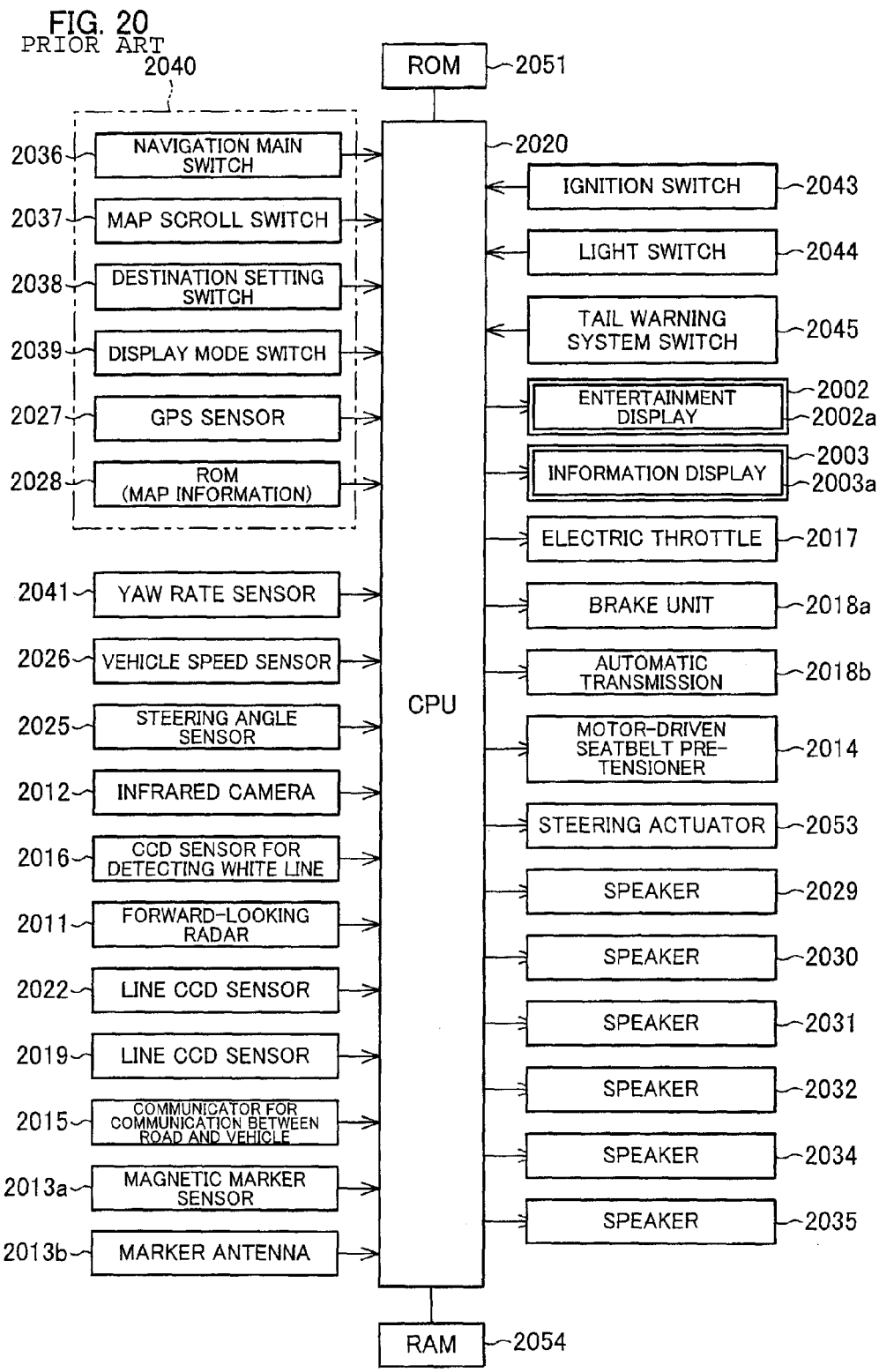
FIG. 20 is a block diagram of a conventional instrument panel display system.

For example, as shown in FIG. 18, being different from the arrangement shown in FIG. 1, the display data memory 15 is included in the liquid crystal controller 11 in the display platform section 6, and this display data memory 15 includes a background image storage section 15a for storing data for displaying a background image and an image layout table 15b for generating image layout data.

In other words, in the instrument panel display system 1 shown in FIG. 18, background images are stored on the display platform section 6 side.

This makes it possible to reduce the communications traffic on the in-vehicle LAN 31, by the data amount for still images.

In the instrument panel display system 1 shown in FIG. 18, image data for generating still images, among the aforesaid data used in main events and sub events, is stored in the display data memory 15, whereas image data for generating moving images is obtained from the processors.

As described above, in the instrument display system 1, sets of image data (background image data) used for generating still images used in main events and sub events for generating an instrument panel display image are stored on the display platform section 6 side. With this, as compared to the case where sets of background image data are stored in different processors, the management of the background image data can be easily done, the communications traffic on the in-vehicle LAN 31 is reduced, and hence the burden on the network is reduced.

As described above, instead of storing in the display data memory 15 all background image data used in main events and sub events, it is possible to adopt such an arrangement that only the background image data for main events is stored in the display data memory 15 whereas the background image data for sub events is stored in the processors. Also, it is possible to adopt such an arrangement that only background image data for sub events is stored in the display data memory 15 whereas the background image data used in main events is stored in the processors.

The technical idea of the present invention can be adopted not only to a display system mounted on a movable body but also to other uses. In the latter case, the technical idea of the present invention can be expressed as a display system for displaying plural sets of information as images, in which sets of data for displaying the images are generated in a shared manner by plural processors.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The display system of the present invention can be broadly used as an information display system for vehicles such as cars and trains, airplanes, ships, and the like.

The invention claimed is:
1. A system comprising:
a display system mounted on a controllable movable body;
a display device included in the display system, the display device being arranged to simultaneously display images respectively corresponding to different sets of information including information about the controllable movable body, amenity information, and safety information; and a plurality of processors; wherein
data is generated by the plurality of processors in a shared manner to display the respective images;
the data includes image data and image layout data;
at least one of size, position, and overlap of the image layout data of the respective images is changed such that a positional relationship between the respective images displayed on the display device changes in response to the information about the controllable movable body; and
the plurality of processors are arranged to correspond to respective sets of information and to generate data to display the corresponding sets of information as images.

2. The system according to claim 1, further comprising a display control device arranged to generate images to be displayed by using the data generated by the plurality of processors.

* * * * *